US012576867B2

(12) United States Patent
Jing et al.

(10) Patent No.: US 12,576,867 B2
(45) Date of Patent: Mar. 17, 2026

(54) DETERMINATION METHOD FOR DRIVE FORCE TO BE REQUESTED FOR HYBRID VEHICLE, AND APPARATUS

(71) Applicants: ZHEJIANG GEELY HOLDING GROUP CO., LTD., Hangzhou (CN); NINGBO GEELY ROYAL ENGINE COMPONENTS CO., LTD., Ningbo City (CN); Aurobay Technology Co., Ltd., Ningbo (CN)

(72) Inventors: Junchao Jing, Ningbo City (CN); Yiqiang Liu, Ningbo City (CN); Weishan Huang, Ningbo City (CN); Botao Zuo, Ningbo City (CN); Ruiping Wang, Ningbo City (CN); Ingo Scholten, Ningbo City (CN)

(73) Assignees: Aurobay (Ningbo) Intelligent Technology Co., Ltd., Ningbo (CN); Aurobay Technology Co., Ltd., Ningbo (CN)

( * ) Notice: Subject to any disclaimer, the term of this patent is extended or adjusted under 35 U.S.C. 154(b) by 0 days.

(21) Appl. No.: 18/280,464

(22) PCT Filed: May 20, 2021

(86) PCT No.: PCT/CN2021/094924
§ 371 (c)(1),
(2) Date: Sep. 5, 2023

(87) PCT Pub. No.: WO2022/241720
PCT Pub. Date: Nov. 24, 2022

(65) Prior Publication Data
US 2024/0157956 A1      May 16, 2024

(51) Int. Cl.
*B60W 50/00*      (2006.01)
*B60W 20/10*      (2016.01)
(Continued)

(52) U.S. Cl.
CPC .......... *B60W 50/087* (2013.01); *B60W 20/10* (2013.01); *B60W 50/10* (2013.01); *B60W 2510/10* (2013.01)

(58) Field of Classification Search
CPC .... B60W 50/087; B60W 50/10; B60W 20/10; B60W 20/11; B60W 2510/10;
(Continued)

(56) References Cited

U.S. PATENT DOCUMENTS 6,359,404 B1 * 3/2002 Sugiyama ............. B60W 20/00
                                                    318/432
2004/0259682 A1 * 12/2004 Tabata .................. F02D 41/023
                                                    477/107
(Continued)

FOREIGN PATENT DOCUMENTS

CN      104619567 A      5/2015
CN      104812641 A      7/2015
(Continued)

OTHER PUBLICATIONS

European Search Report for 21854799.0 Mailed Oct. 5, 2022.
(Continued)

*Primary Examiner* — Phutthiwat Wongwian
*Assistant Examiner* — Sherman D Manley
(74) *Attorney, Agent, or Firm* — Ling Wu; Stephen Yang; Ling and Yang Intellectual Property

(57) ABSTRACT

A determination method for a drive force to be requested for a hybrid vehicle, and an apparatus. The determination method comprises the following steps: obtaining a gear state, a current vehicle speed, a current gas pedal degree of engagement, and drive force mapping information of a vehicle, the drive force mapping information indicating a correspondence relationship between vehicle speed, gas pedal degree of engagement, and drive force; if the gear state
(Continued)

is such that the vehicle is not in park gear or neutral gear, obtaining a driving mode and altitude data of the vehicle; and if the altitude data is less than a preset altitude, determining a drive force to be requested for the vehicle on the basis of the current vehicle speed, the current gas pedal degree of engagement, the driving mode, and the drive force mapping information.

16 Claims, 8 Drawing Sheets

(51) Int. Cl.
  *B60W 50/08* (2020.01)
  *B60W 50/10* (2012.01)

(58) Field of Classification Search
  CPC ... B60W 2510/1005; B60W 2510/101; B60W 2050/0026; B60W 2520/10; B60W 2540/10; B60W 2552/25; B60W 2555/40; B60W 10/06; B60W 10/08; Y02T 10/62
  See application file for complete search history.

(56) References Cited

U.S. PATENT DOCUMENTS

| | | | | |
|---|---|---|---|---|
| 2008/0051962 A1* | 2/2008 | Nakai | ..................... | B60T 8/172 |
| | | | | 701/70 |
| 2008/0228363 A1* | 9/2008 | Kouno | ..................... | B60K 6/48 |
| | | | | 701/54 |
| 2009/0071736 A1* | 3/2009 | Mori | ..................... | B60W 10/08 |
| | | | | 701/84 |
| 2012/0029777 A1* | 2/2012 | Tao | ..................... | F16H 61/0213 |
| | | | | 701/60 |
| 2012/0059544 A1* | 3/2012 | Kinoshita | ............. | B60W 10/06 |
| | | | | 903/902 |
| 2012/0143416 A1* | 6/2012 | Park | ..................... | B60W 20/13 |
| | | | | 180/65.265 |
| 2017/0253240 A1* | 9/2017 | Kishida | .................... | B60K 6/48 |
| 2018/0162367 A1* | 6/2018 | Oh | ......................... | B60W 40/00 |
| 2018/0251118 A1* | 9/2018 | Gaither | ..................... | B60L 7/10 |
| 2020/0385013 A1* | 12/2020 | Janampally | .......... | B60W 50/16 |
| 2021/0009138 A1* | 1/2021 | Janampally | .......... | B60W 40/06 |
| 2023/0373296 A1* | 11/2023 | Omuro | .............. | B60K 23/0808 |

FOREIGN PATENT DOCUMENTS

| | | |
|---|---|---|
| CN | 107738649 A | 2/2018 |
| CN | 112012835 A | 12/2020 |
| CN | 112373318 A | 2/2021 |
| JP | 2009173235 A | 8/2009 |
| JP | 2019196740 A | 11/2019 |

OTHER PUBLICATIONS

International Search Report for PCT/CN2021/094924 Mailed Feb. 11, 2022.
Examination Report for EP21854799.0 Mailed Oct. 8, 2024.

* cited by examiner

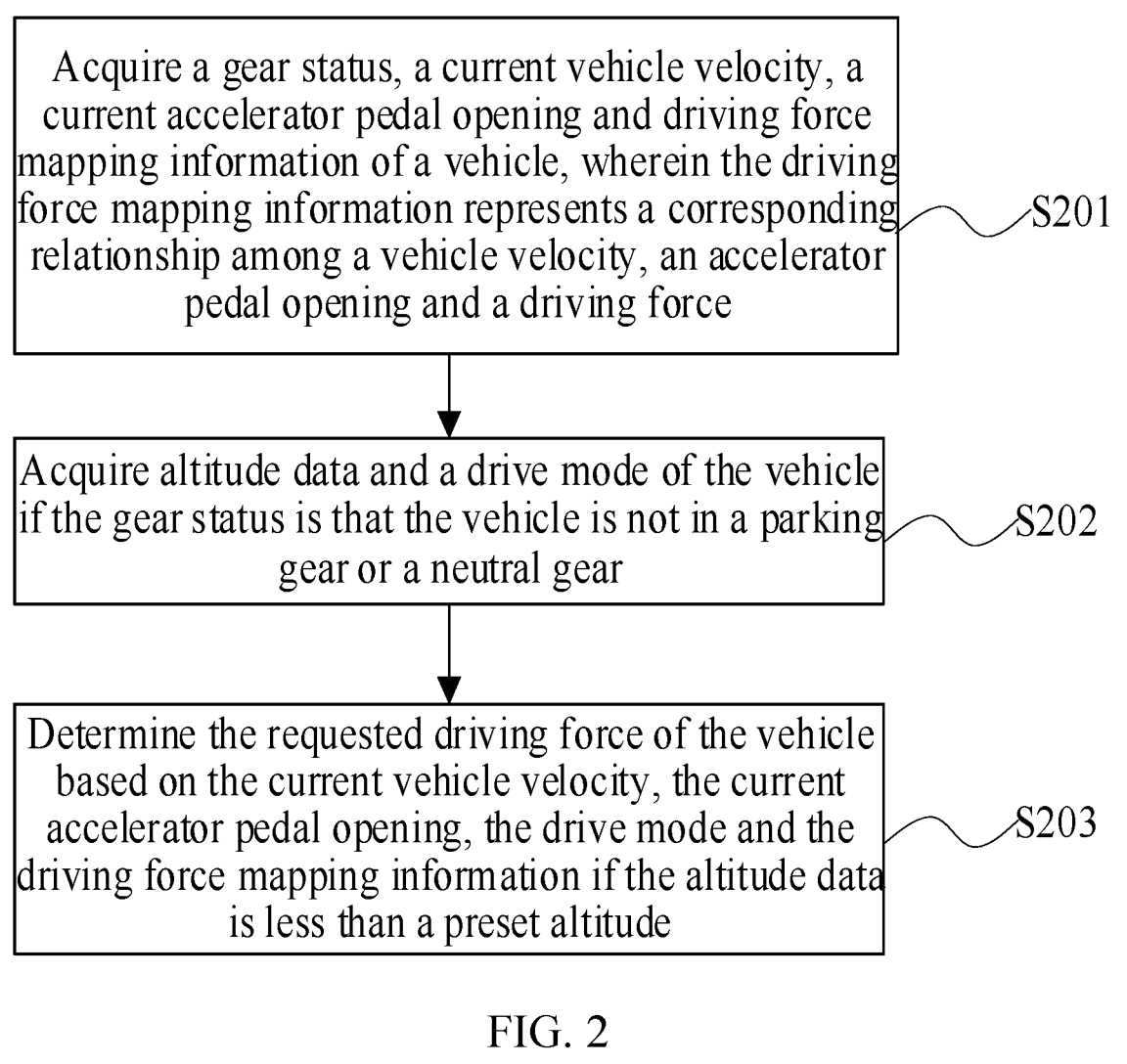

Acquire a gear status, a current vehicle velocity, a current accelerator pedal opening and driving force mapping information of a vehicle, wherein the driving force mapping information represents a corresponding relationship among a vehicle velocity, an accelerator pedal opening and a driving force ⟋⌣⟋S201

↓

Acquire altitude data and a drive mode of the vehicle if the gear status is that the vehicle is not in a parking gear or a neutral gear ⟋⌣⟋S202

↓

Determine the requested driving force of the vehicle based on the current vehicle velocity, the current accelerator pedal opening, the drive mode and the driving force mapping information if the altitude data is less than a preset altitude ⟋⌣⟋S203

FIG. 2

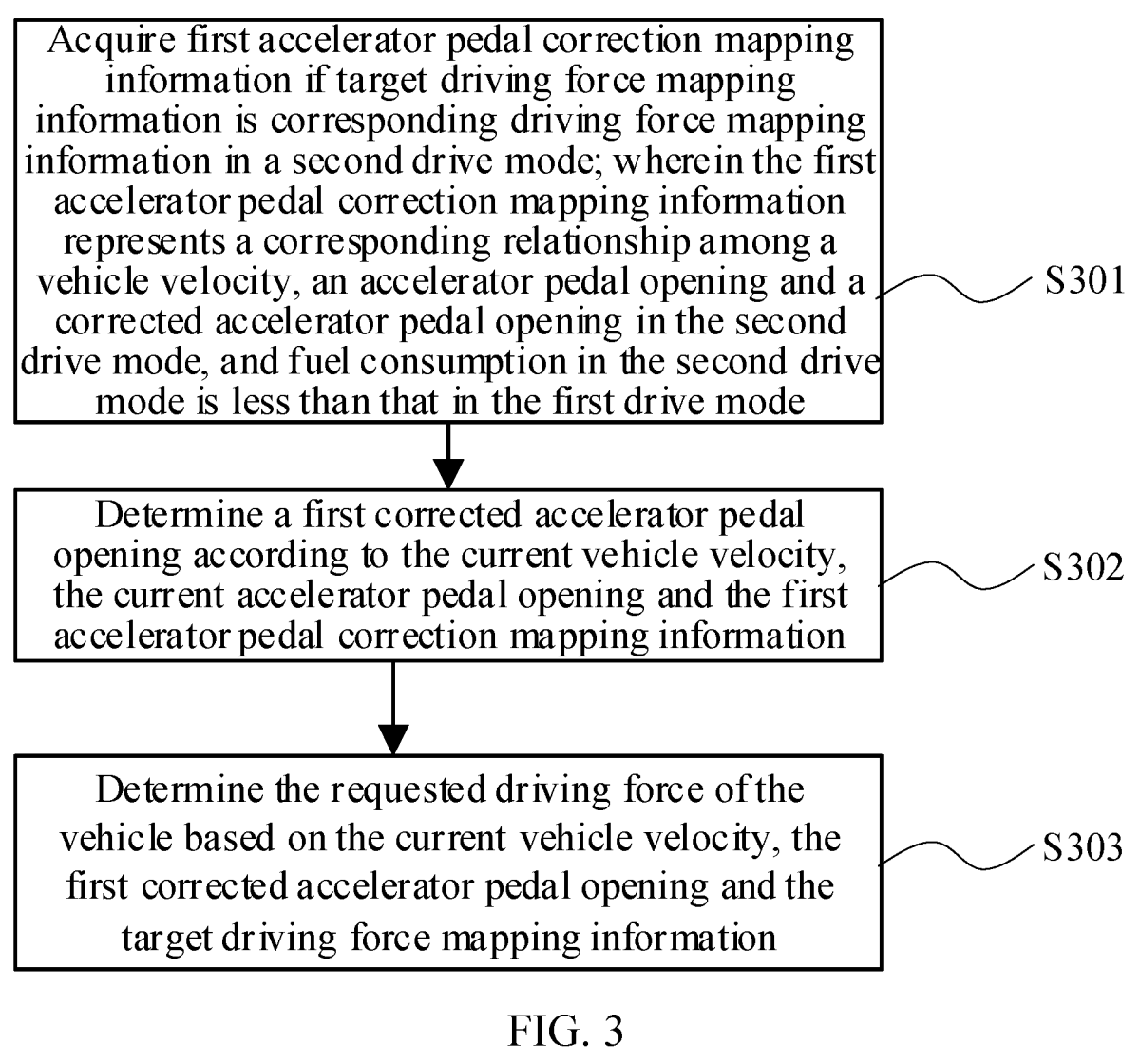

Acquire first accelerator pedal correction mapping information if target driving force mapping information is corresponding driving force mapping information in a second drive mode; wherein the first accelerator pedal correction mapping information represents a corresponding relationship among a vehicle velocity, an accelerator pedal opening and a corrected accelerator pedal opening in the second drive mode, and fuel consumption in the second drive mode is less than that in the first drive mode — S301

Determine a first corrected accelerator pedal opening according to the current vehicle velocity, the current accelerator pedal opening and the first accelerator pedal correction mapping information — S302

Determine the requested driving force of the vehicle based on the current vehicle velocity, the first corrected accelerator pedal opening and the target driving force mapping information — S303

FIG. 3

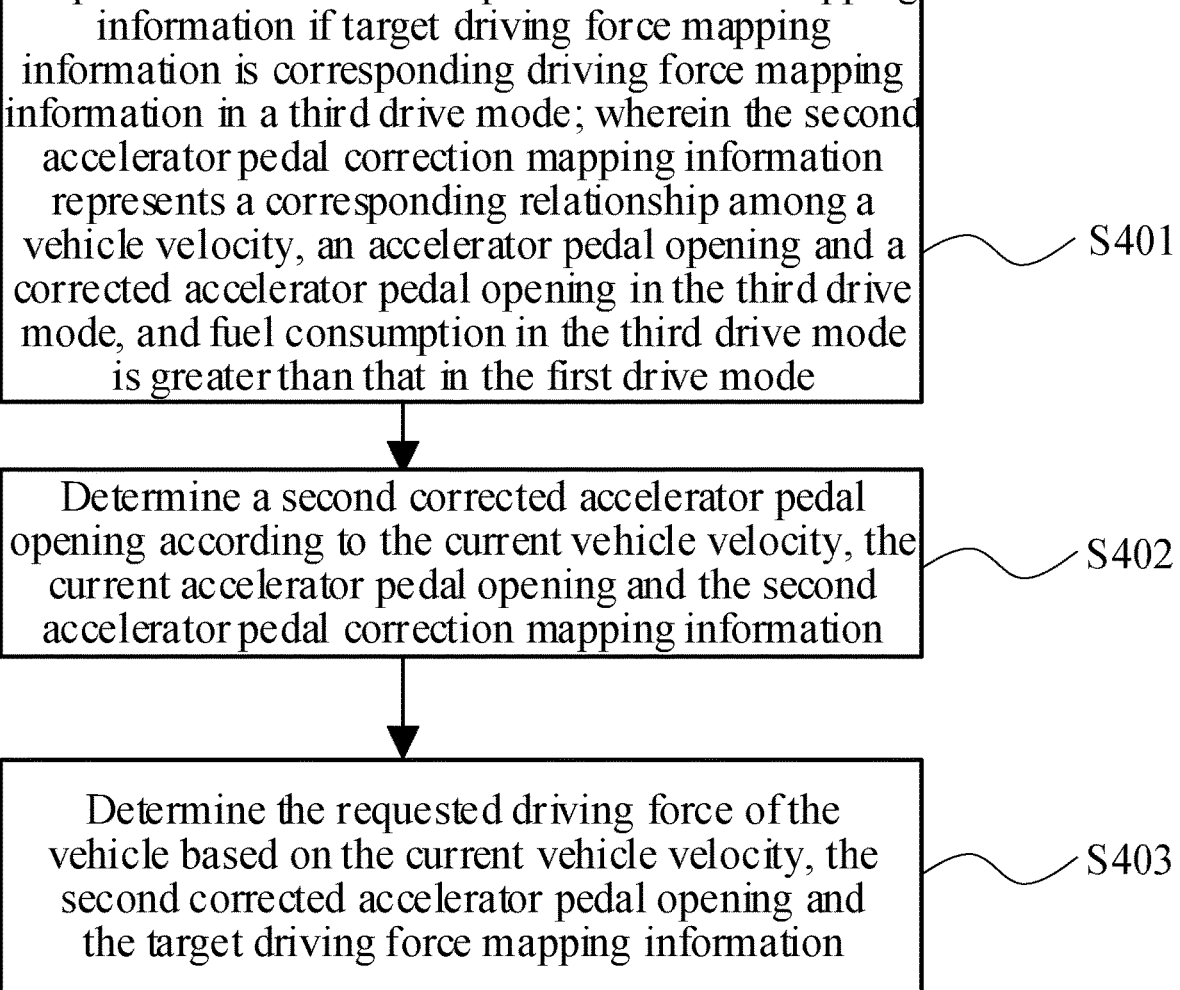

Acquire second accelerator pedal correction mapping information if target driving force mapping information is corresponding driving force mapping information in a third drive mode; wherein the second accelerator pedal correction mapping information represents a corresponding relationship among a vehicle velocity, an accelerator pedal opening and a corrected accelerator pedal opening in the third drive mode, and fuel consumption in the third drive mode is greater than that in the first drive mode          S401

Determine a second corrected accelerator pedal opening according to the current vehicle velocity, the current accelerator pedal opening and the second accelerator pedal correction mapping information          S402

Determine the requested driving force of the vehicle based on the current vehicle velocity, the second corrected accelerator pedal opening and the target driving force mapping information          S403

FIG. 4

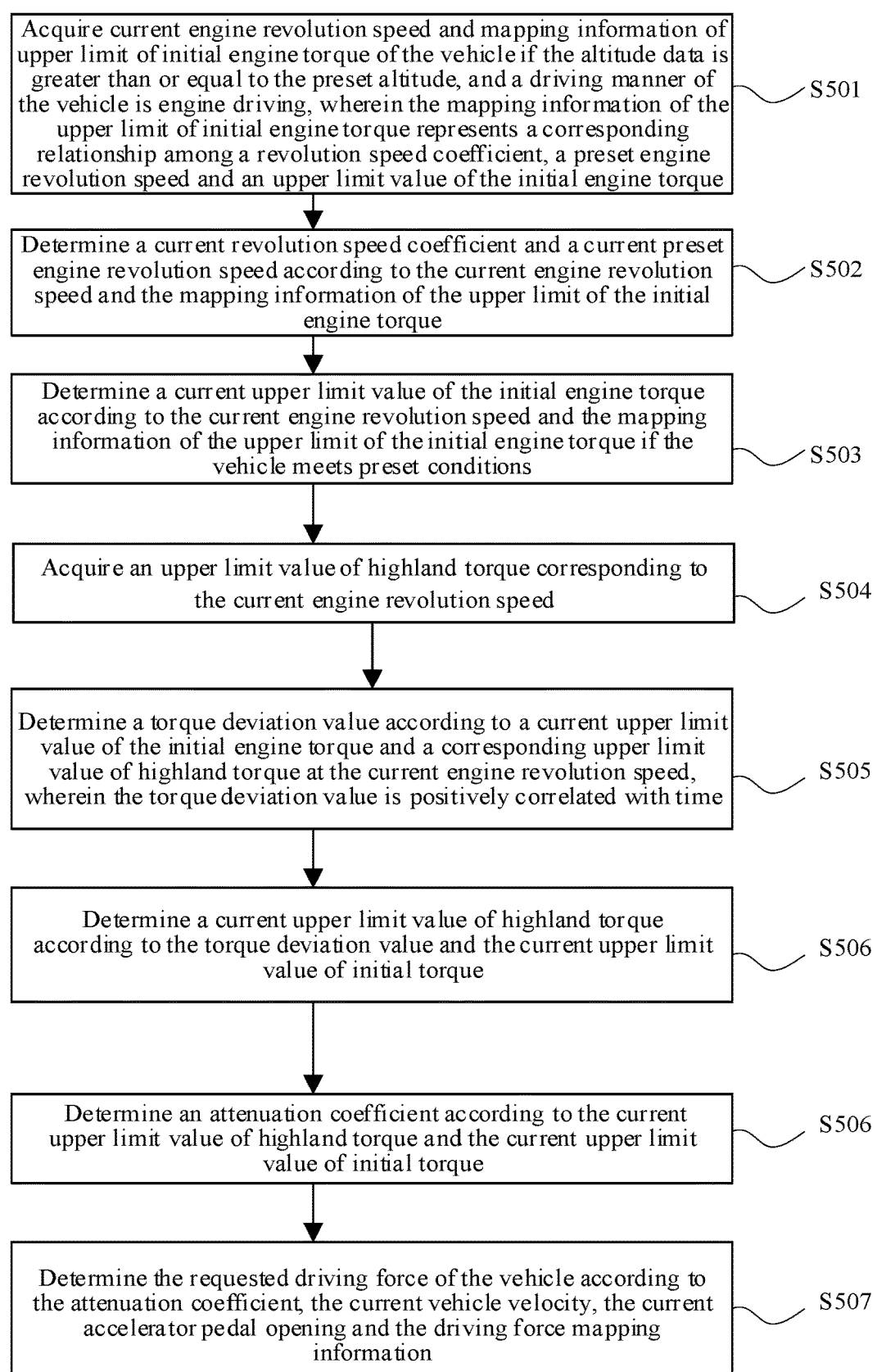

Acquire current engine revolution speed and mapping information of upper limit of initial engine torque of the vehicle if the altitude data is greater than or equal to the preset altitude, and a driving manner of the vehicle is engine driving, wherein the mapping information of the upper limit of initial engine torque represents a corresponding relationship among a revolution speed coefficient, a preset engine revolution speed and an upper limit value of the initial engine torque ⟶ S501

Determine a current revolution speed coefficient and a current preset engine revolution speed according to the current engine revolution speed and the mapping information of the upper limit of the initial engine torque ⟶ S502

Determine a current upper limit value of the initial engine torque according to the current engine revolution speed and the mapping information of the upper limit of the initial engine torque if the vehicle meets preset conditions ⟶ S503

Acquire an upper limit value of highland torque corresponding to the current engine revolution speed ⟶ S504

Determine a torque deviation value according to a current upper limit value of the initial engine torque and a corresponding upper limit value of highland torque at the current engine revolution speed, wherein the torque deviation value is positively correlated with time ⟶ S505

Determine a current upper limit value of highland torque according to the torque deviation value and the current upper limit value of initial torque ⟶ S506

Determine an attenuation coefficient according to the current upper limit value of highland torque and the current upper limit value of initial torque ⟶ S506

Determine the requested driving force of the vehicle according to the attenuation coefficient, the current vehicle velocity, the current accelerator pedal opening and the driving force mapping information ⟶ S507

FIG. 5

DETERMINATION METHOD FOR DRIVE FORCE TO BE REQUESTED FOR HYBRID VEHICLE, AND APPARATUS

CROSS-REFERENCE TO RELATED APPLICATION

The present application is a U.S. National Phase Entry of International Application PCT/CN2021/094924 having an international filing date of May 20, 2021, and entitled "Determination Method for Drive Force to be Requested for Hybrid Vehicle, and Apparatus", the contents of which should be regarded as being incorporated herein by reference.

TECHNICAL FIELD

The present disclosure relates to the technical field of vehicles, in particular to a method and a device for determining a requested driving force of a hybrid vehicle.

BACKGROUND

With increasingly strict requirements of national regulations on fuel consumption and emission, and development of electrification systems, hybrid technology is a key for realizing energy saving and emission reduction. In order to adapt to national policies and meet emission regulations, original equipment manufacturers and parts suppliers are both looking for solutions. However, at present, battery technology of pure electric vehicle technology system is complex with relative high cost. Therefore, the hybrid system is vigorously promoted. A dual-electric motor hybrid system is researched herein, as shown in FIG. 1. An electric motor in a dual-electric motor hybrid system has three modes, i.e.: pure electric mode, series mode and parallel mode. P2 drives wheels in the series mode, a clutch C0 of an automatic transmission is not engaged in the series mode, an engine charges the battery through P1, and P2 drives the wheels. In the parallel mode, the clutch C0 is engaged and the engine directly drives the wheels.

For a hybrid vehicle, the vehicle is usually equipped with a high-power electric motor that can drive the vehicle independently, therefore there is a case of engine shutdown with a certain vehicle velocity, and since a driving force is provided only by the electric motor a transmission ratio from the engine to the wheels at this point is invalid. While a specific process of demanding requested torque/force based on a flywheel end employed in the prior art is as follows: first, a torque request of an engine crankshaft is obtained based on table look-up of an accelerator pedal opening and an engine revolution speed, and then the torque request of the engine crankshaft is converted into traction request of the vehicle, while the process for obtaining the value of demanded torque based on table look-up of the accelerator pedal opening and the engine revolution speed is not suitable for hybrid vehicles.

SUMMARY

The present disclosure aims to solve a technical problem that the requested driving force of a hybrid vehicle cannot be effectively requested in the prior art.

In order to solve the technical problem above, in one aspect, a method for determining a requested driving force of a hybrid vehicle is disclosed in the present application, which includes the following steps:

acquiring gear status, a current vehicle velocity, a current accelerator pedal opening and driving force mapping information of the vehicle, wherein the driving force mapping information represents a corresponding relationship among a vehicle velocity, an accelerator pedal opening and a driving force;

acquiring altitude data and a drive mode of the vehicle if the gear status is that the vehicle is not in a parking gear or a neutral gear; and determining the requested driving force of the vehicle based on the current vehicle velocity, the current accelerator pedal opening, the drive mode and the driving force mapping information if the altitude data is less than a preset altitude.

In another aspect, a device for determining a requested driving force is further disclosed in present application, which includes:

a first acquisition module, configured to acquire a gear status, a current vehicle velocity, a current accelerator pedal opening and driving force mapping information of the vehicle, wherein the driving force mapping information represents a corresponding relationship among a vehicle velocity, an accelerator pedal opening and a driving force;

a second acquisition module, configured to acquire altitude data and a drive mode of the vehicle if the gear status is that the vehicle is not in a parking gear or a neutral gear; and a determination module, configured to determine the requested driving force of the vehicle based on the current vehicle velocity, the current accelerator pedal opening, the driving mode and the driving force mapping information if the altitude data is less than a preset altitude.

In another aspect, a device is further disclosed in the present application, which includes a processor and a memory, wherein at least one instruction, at least one program, a code set or an instruction set is stored in the memory. And the at least one instruction, the at least one program, the code set or the instruction set is loaded and executed by the processor to implement the method for determining the requested driving force.

In another aspect, a computer storage medium is further disclosed in the present application, wherein at least one instruction or at least one program is stored in the computer storage media, and the at least one instruction or at least one program is loaded and executed by a processor to implement the method for determining the requested driving force.

By employing the technical solution described above, the method for determining the requested driving force according to the present application has the following beneficial effects:

A method for determining the requested driving force of a hybrid vehicle is disclosed in the present application, which includes the following steps: acquiring gear status, a current vehicle velocity, a current accelerator pedal opening and driving force mapping information of the vehicle, wherein the driving force mapping information represents a corresponding relationship among a vehicle velocity, an accelerator pedal opening and a driving force; acquiring altitude data and a drive mode of the vehicle if the gear status is that the vehicle is not in a parking gear or a neutral gear; determining the requested driving force of the vehicle based on the current vehicle velocity, the current accelerator pedal opening, the drive mode and the driving force mapping information if the altitude data is less than a preset altitude. In this situation, the requested driving force of the vehicle can be obtained in the present application by defining the mapping information of vehicle velocity, accelerator pedal opening and driving force. During such process, the vehicle condition is also determined by judging the gear status of the vehicle and the situation of altitude mode and drive mode, and the obtained requested driving force is different according to these conditions of the vehicle, so as to meet the different driveability of drivers, and while the driveability is improved, the problem that the idle traveling distance of the pedal is too long when the accelerator pedal is greatly pressed due to attenuation of engine torque capacity in high altitude or high temperature environment is also avoided at same time.

BRIEF DESCRIPTION OF DRAWINGS

In order to more clearly explain technical solutions in the embodiments of the present application, accompanying drawings used in the description of the embodiments will briefly introduced in the following. It is apparent that the drawings in the following description are only some embodiments of the present application, and for those of ordinary skills in the art, other drawings can be obtained according to these drawings without using inventive efforts.

FIG. 2 is a flow diagram of an optional method for determining a requested driving force according to the present application.

FIG. 3 is a flow diagram of another optional method for determining a requested driving force according to the present application.

FIG. 4 is a flow diagram of another optional method for determining a requested driving force according to the present application.

FIG. 5 is a flow diagram of another optional method for determining a requested driving force according to the present application.

DETAILED DESCRIPTION

The technical solution in the embodiment of the present application will be clearly and completely described below in combination with the drawings in the embodiments of the present application. It is apparent that the embodiments described herein are only parts of the embodiments of the present application rather than the entirety thereof. Based on the embodiments in the present application, all other embodiments obtained by those of ordinary skills in the art without inventive efforts are within the scope of protection of the present application.

It should be noted that the terms "first", "second" and the like in the specification and claims of the present application and the drawings above are used to distinguish similar objects, but are not necessarily used for the description of a specific order or sequence. It should be understood that data used in such way can be interchanged in appropriate situation, so that the embodiments of the present application described herein can be implemented in an order in addition to those illustrated or described herein. In addition, the terms "include", "include" and "have" and any variation thereof are intended to cover non-exclusive inclusion, for example, a process, method, system, product or server containing a series of steps or units are not necessarily limited to those steps or units explicitly listed, but may include other steps or units which are not explicitly listed or inherent to these processes, methods, products or apparatus.

Figure 1:
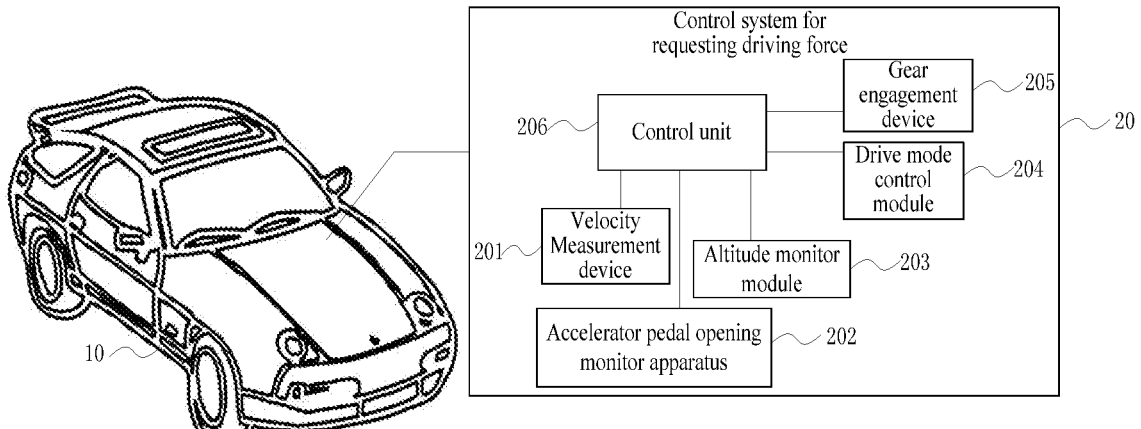
FIG. 1 is an application scenario diagram according to the present application.

As shown in FIG. 1, it is an application scenario diagram according to the present application. The scenario includes a hybrid vehicle 10 and a control system 20 in the hybrid vehicle for requesting a driving force. The control system 20 includes a velocity measurement device 201, an accelerator pedal opening monitor apparatus 202, an altitude monitor module 203, a drive mode control module 204, a gear engagement device 205 and a control unit 206. The control unit 206 is electrically connected with the velocity measurement device 201, the accelerator pedal opening monitor apparatus 202, the altitude monitor module 203, the drive mode control module 204, and the gear engagement device 205, wherein the gear engagement device 205 is configured to obtain gear status of the vehicle and send the gear status to the control unit 206. The velocity measurement device 201 is configured to monitor vehicle velocity and send the current vehicle velocity to the control unit 206. The accelerator pedal opening monitor apparatus 202 is configured to monitor an accelerator pedal opening of the vehicle and send the current accelerator pedal opening of the vehicle to the control unit 206. The altitude monitor module 203 is configured to obtain altitude data of the current of the vehicle and send the altitude data to the control unit 206. The drive mode control module 204 is configured to monitor a drive mode of the vehicle and send the drive mode to the control unit 206.

The control unit 206 is configured to receive the gear status sent by the gear engagement device 205, the current vehicle velocity sent by the velocity measurement device 201 and the current accelerator pedal opening sent by the accelerator pedal opening monitor apparatus 202, and acquire driving force mapping information stored in its storage unit. The driving force mapping information represents a corresponding relationship among the vehicle velocity, the accelerator pedal opening and the driving force, and judges the gear status. If the gear status is that the vehicle is not in a parking gear or neutral gear, the control unit 206 is further configured to receive the altitude data sent by the altitude monitor module 203 and the drive mode sent by the drive mode control module 204, and judges the altitude data. If the altitude data is less than a preset altitude, it is configured to determine a requested driving force of the vehicle based on the current vehicle velocity, the current accelerator pedal opening, the drive mode and the driving force mapping information. Therefore, the requested driving force obtained by using the control system 20 in the present application has better driveability. Due to consideration of the altitude and the gear status, a problem that an idle traveling distance of the pedal is too long when the accelerator pedal is greatly pressed due to attenuation of the engine torque capacity at a high altitude or in a high temperature environment can be avoided, thus the driveability of the vehicle and the sensitivity of the accelerator pedal are further improved.

A method for determining a requested driving force of a hybrid vehicle is provided in the present application, as shown in FIG. 2, which is a flow diagram of an optional method for determining a requested driving force of the present application, which includes the following steps:

S201: acquiring a gear status, a current vehicle velocity, a current accelerator pedal opening and driving force mapping information of a vehicle, wherein the driving force mapping information represents a corresponding relationship among a vehicle velocity, an accelerator pedal opening and a driving force.

Optionally, in the present embodiment, the gear status in the present embodiment includes a parking gear, a neutral gear, a forward gear and a reverse gear of the vehicle.

Optionally, in the present embodiment, because the driving forces corresponding to vehicle velocities and accelerator pedal openings in different drive modes are different, different drive modes can meet a driver's driving experience under different road conditions. Optionally, the drive modes can include the following three kinds mentioned below: a first drive mode, a second drive mode and a third drive mode, wherein these three drive modes described above are sequenced according to fuel consumption from high to low: fuel consumption in the third drive mode is higher than that in the second drive mode, and the fuel consumption in the second drive mode is higher than that in the first drive mode. Optionally, the third drive mode focuses more on power, which can be used in situations where going uphill or overtaking is required, and the second drive mode is a fuel-saving mode. Certainly, the drive modes can also be divided into two or four of types as required.

Optionally, contents of the driving force mapping information can be classified according to different drive modes, and the driving force mapping information includes first driving force mapping information, second driving force mapping information and third driving force mapping information, which correspond to the driving force mapping information in the first drive mode, the second drive mode and the third drive mode, respectively.

Optionally, due to the driving experience of the vehicle is different at different altitudes, in order to avoid the problem that the idle traveling distance of the pedal is too long when the accelerator pedal is greatly pressed due to the attenuation of engine torque capability at high altitude, the present application further proposes a technical solution related in the following: when the altitude data is greater than the preset altitude data, the vehicle is in a highland environment at this point, and the driving force mapping information further includes a fourth driving force mapping information in the highland environment.

Optionally, the contents corresponding to the four types of driving force mapping information described above can be expressed as the following four tables, where x: accelerator pedal opening (%); y: vehicle velocity (km/h); z: driving force (N):

TABLE 1-1

| | First driving force table corresponding to the first driving force mapping information | | | | | | | | | | | | | | |
|---|---|---|---|---|---|---|---|---|---|---|---|---|---|---|---|
| xzy | 1 | 2 | 3 | 5 | 10 | 20 | 25 | 30 | 40 | 50 | 60 | 80 | 100 | 120 | 140 |
| 0 | 0 | 0 | 0 | 0 | −400 | −300 | −250 | −250 | −200 | −200 | −200 | −200 | −200 | −200 | −200 |
| 10 | 362 | 355 | 348 | 334 | 303 | 254 | 236 | 222 | 198 | 176 | 156 | 122 | 97 | 81 | 69 |
| 15 | 815 | 791 | 769 | 725 | 630 | 495 | 454 | 432 | 405 | 376 | 347 | 292 | 243 | 202 | 173 |
| 20 | 1448 | 1415 | 1383 | 1321 | 1183 | 972 | 899 | 848 | 769 | 697 | 632 | 521 | 434 | 361 | 310 |
| 25 | 2226 | 2188 | 2150 | 2077 | 1909 | 1636 | 1530 | 1445 | 1295 | 1156 | 1032 | 824 | 667 | 556 | 477 |
| 30 | 3077 | 3048 | 3019 | 2962 | 2821 | 2545 | 2410 | 2278 | 2016 | 1776 | 1563 | 1218 | 965 | 804 | 689 |
| 35 | 3928 | 3900 | 3872 | 3816 | 3671 | 3364 | 3203 | 3035 | 2695 | 2390 | 2124 | 1699 | 1395 | 1178 | 1022 |
| 40 | 5249 | 5202 | 5155 | 5062 | 4832 | 4389 | 4176 | 3968 | 3557 | 3127 | 2768 | 2227 | 1864 | 1619 | 1443 |
| 50 | 7964 | 7898 | 7832 | 7700 | 7374 | 6734 | 6420 | 6110 | 5495 | 4936 | 4439 | 3622 | 3006 | 2546 | 2200 |
| 60 | 11463 | 11425 | 11383 | 11294 | 11028 | 10318 | 9872 | 9367 | 8298 | 7351 | 6527 | 5211 | 4249 | 3544 | 3014 |
| 70 | 14691 | 14691 | 14691 | 14691 | 14691 | 14691 | 14691 | 14118 | 11250 | 9529 | 8294 | 6618 | 5294 | 4412 | 3782 |
| 80 | 19412 | 19412 | 19412 | 19412 | 19412 | 19412 | 19412 | 19412 | 14559 | 11647 | 9706 | 7279 | 5824 | 4853 | 4160 |
| 90 | 32767 | 32767 | 32767 | 32767 | 19412 | 19412 | 19412 | 19412 | 14559 | 11647 | 9706 | 7279 | 5824 | 4853 | 4160 |
| 100 | 32767 | 32767 | 32767 | 32767 | 19412 | 19412 | 19412 | 19412 | 14559 | 11647 | 9706 | 7279 | 5824 | 4853 | 4160 |

TABLE 1-2

| | Second driving force table corresponding to the second driving force mapping information | | | | | | | | | | | | | | |
|---|---|---|---|---|---|---|---|---|---|---|---|---|---|---|---|
| xzy | 1 | 2 | 3 | 5 | 10 | 20 | 25 | 30 | 40 | 50 | 60 | 80 | 100 | 120 | 140 |
| 0 | 0 | 0 | 0 | 0 | −400 | −300 | −250 | −250 | −200 | −200 | −200 | −200 | −200 | −200 | −200 |
| 10 | 362 | 350 | 338 | 315 | 264 | 189 | 165 | 149 | 127 | 109 | 94 | 73 | 59 | 49 | 42 |
| 15 | 597 | 574 | 552 | 509 | 416 | 289 | 255 | 240 | 231 | 220 | 208 | 184 | 160 | 133 | 114 |
| 20 | 905 | 874 | 844 | 786 | 662 | 493 | 448 | 430 | 421 | 408 | 392 | 354 | 313 | 261 | 224 |
| 25 | 1448 | 1414 | 1382 | 1320 | 1181 | 976 | 910 | 867 | 808 | 750 | 695 | 594 | 506 | 422 | 362 |
| 30 | 1901 | 1871 | 1842 | 1786 | 1657 | 1450 | 1370 | 1307 | 1198 | 1096 | 1002 | 840 | 710 | 592 | 507 |
| 35 | 2715 | 2660 | 2606 | 2502 | 2267 | 1900 | 1767 | 1670 | 1508 | 1364 | 1267 | 1039 | 875 | 731 | 627 |
| 40 | 3530 | 3461 | 3393 | 3264 | 2969 | 2502 | 2329 | 2198 | 1976 | 1777 | 1587 | 1301 | 1070 | 915 | 784 |
| 50 | 6154 | 6057 | 5961 | 5775 | 5337 | 4584 | 4268 | 3992 | 3482 | 3047 | 2680 | 2138 | 1753 | 1502 | 1288 |
| 60 | 9895 | 9706 | 9521 | 9161 | 8326 | 6931 | 6371 | 5902 | 5055 | 4351 | 3772 | 2976 | 2485 | 2090 | 1791 |
| 70 | 13877 | 13570 | 13271 | 12695 | 11383 | 9307 | 8544 | 7964 | 6987 | 6149 | 5436 | 4320 | 3496 | 2942 | 2522 |
| 80 | 13877 | 13877 | 13877 | 13877 | 13877 | 13877 | 13781 | 12706 | 10191 | 8682 | 7676 | 6287 | 5241 | 4412 | 3782 |
| 90 | 32767 | 32767 | 32767 | 32767 | 17647 | 17647 | 17647 | 17647 | 14559 | 11647 | 9706 | 7279 | 5824 | 4853 | 4160 |
| 100 | 32767 | 32767 | 32767 | 32767 | 17647 | 17647 | 17647 | 17647 | 14559 | 11647 | 9706 | 7279 | 5824 | 4853 | 4160 |

TABLE 1-3

| | | | | | | | Third driving force table corresponding to the third driving force mapping information | | | | | | | | |
| --- | --- | --- | --- | --- | --- | --- | --- | --- | --- | --- | --- | --- | --- | --- | --- |
| xzy | 1 | 2 | 3 | 5 | 10 | 20 | 25 | 30 | 40 | 50 | 60 | 80 | 100 | 120 | 140 |
| 0 | 0 | 0 | 0 | 0 | −400 | −300 | −250 | −250 | −200 | −200 | −200 | −200 | −200 | −200 | −200 |
| 10 | 428 | 423 | 418 | 409 | 386 | 345 | 325 | 307 | 274 | 245 | 219 | 176 | 143 | 119 | 102 |
| 15 | 1086 | 1075 | 1064 | 1043 | 991 | 895 | 850 | 807 | 727 | 655 | 589 | 479 | 391 | 326 | 280 |
| 20 | 1975 | 1953 | 1932 | 1889 | 1787 | 1598 | 1511 | 1429 | 1277 | 1143 | 1023 | 825 | 673 | 561 | 481 |
| 25 | 3197 | 3154 | 3111 | 3026 | 2825 | 2463 | 2300 | 2149 | 1878 | 1646 | 1449 | 1140 | 922 | 768 | 659 |
| 30 | 4219 | 4161 | 4104 | 3992 | 3729 | 3263 | 3058 | 2870 | 2541 | 2268 | 2042 | 1704 | 1477 | 1317 | 1191 |
| 35 | 5772 | 5694 | 5617 | 5467 | 5116 | 4505 | 4241 | 4001 | 3588 | 3251 | 2978 | 2575 | 2294 | 2073 | 1865 |
| 40 | 7165 | 7096 | 7028 | 6896 | 6582 | 6020 | 5770 | 5538 | 5123 | 4764 | 4451 | 3929 | 3498 | 3111 | 2739 |
| 50 | 13567 | 13389 | 13213 | 12868 | 12050 | 10584 | 9931 | 9326 | 8251 | 7335 | 6557 | 5337 | 4452 | 3791 | 3265 |
| 60 | 18068 | 17840 | 17614 | 17171 | 16111 | 14184 | 13311 | 12494 | 11017 | 9732 | 8618 | 6618 | 5294 | 4412 | 3779 |
| 70 | 19412 | 19412 | 19412 | 19412 | 19412 | 19412 | 19412 | 19412 | 14559 | 11647 | 9706 | 7279 | 5824 | 4853 | 4160 |
| 80 | 19412 | 19412 | 19412 | 19412 | 19412 | 19412 | 19412 | 19412 | 14559 | 11647 | 9706 | 7279 | 5824 | 4853 | 4160 |
| 90 | 32767 | 32767 | 32767 | 32767 | 19412 | 19412 | 19412 | 19412 | 14559 | 11647 | 9706 | 7279 | 5824 | 4853 | 4160 |
| 100 | 32767 | 32767 | 32767 | 32767 | 19412 | 19412 | 19412 | 19412 | 14559 | 11647 | 9706 | 7279 | 5824 | 4853 | 4160 |

TABLE 1-4

| | | | | | | | Fourth driving force table corresponding to the fourth driving force mapping information | | | | | | | | |
| --- | --- | --- | --- | --- | --- | --- | --- | --- | --- | --- | --- | --- | --- | --- | --- |
| xyz | 1 | 2 | 3 | 5 | 10 | 20 | 25 | 30 | 40 | 50 | 60 | 80 | 100 | 120 | 140 |
| 0 | 0 | 0 | 0 | 0 | −400 | −300 | −250 | −250 | −200 | −200 | −200 | −200 | −200 | −200 | −200 |
| 10 | 264 | 264 | 253 | 231 | 220 | 198 | 217 | 229 | 191 | 169 | 154 | 122 | 98 | 82 | 70 |
| 15 | 860 | 860 | 633 | 578 | 550 | 495 | 542 | 574 | 479 | 424 | 386 | 306 | 245 | 204 | 175 |
| 20 | 1320 | 1320 | 1265 | 1155 | 1100 | 990 | 1015 | 1032 | 862 | 762 | 695 | 551 | 441 | 367 | 315 |
| 25 | 2112 | 2112 | 2024 | 1848 | 1760 | 1584 | 1597 | 1606 | 1340 | 1186 | 1081 | 857 | 686 | 571 | 490 |
| 30 | 3432 | 3432 | 3289 | 3003 | 2860 | 2574 | 2406 | 2294 | 1915 | 1694 | 1544 | 1224 | 979 | 816 | 700 |
| 35 | 4820 | 4820 | 4428 | 4043 | 3850 | 3465 | 3313 | 3212 | 2680 | 2372 | 2162 | 1775 | 1469 | 1265 | 1119 |
| 40 | 6190 | 6072 | 5819 | 5313 | 5060 | 4554 | 4299 | 4129 | 3446 | 3049 | 2857 | 2326 | 1959 | 1755 | 1609 |
| 50 | 9240 | 9240 | 8855 | 8085 | 7700 | 6930 | 6351 | 5965 | 5169 | 4574 | 4169 | 3428 | 2938 | 2612 | 2309 |
| 60 | 15840 | 15840 | 15180 | 13860 | 13200 | 11880 | 10247 | 9159 | 7879 | 6787 | 6055 | 5023 | 4116 | 3512 | 3045 |
| 70 | 21120 | 21120 | 20240 | 18480 | 17800 | 17800 | 14452 | 12353 | 10588 | 9000 | 7941 | 6618 | 5294 | 4412 | 3782 |
| 80 | 21120 | 21120 | 20240 | 18480 | 17800 | 17800 | 17628 | 17647 | 14559 | 11647 | 9706 | 7279 | 5824 | 4853 | 4160 |
| 90 | 32767 | 32767 | 32667 | 32667 | 17800 | 17800 | 17628 | 17647 | 14559 | 11647 | 9706 | 7279 | 5824 | 4853 | 4160 |
| 100 | 32767 | 32767 | 32667 | 32667 | 17800 | 17800 | 17628 | 17647 | 14559 | 11647 | 9706 | 7279 | 5824 | 4853 | 4160 |

Optionally, the driving force data in Table 1-1, Table 1-2, Table 1-3 and Table 1-4 can be calculated based on driving power, and can be calculated by an equation F=P/V, where F—driving force, P—driving power and V—vehicle velocity, and certainly, the data in the four tables above can also be directly obtained by measurement.

Optionally, the step S201 described above includes: acquiring driving power mapping information of the vehicle, wherein the driving power mapping information represents a corresponding relationship among the vehicle velocity, the accelerator pedal opening and the driving force; determining the driving force mapping information according to the driving power mapping information, wherein the driving force mapping information represents a corresponding relationship among the vehicle velocity, the accelerator pedal opening and the driving force; and obtaining the gear status, the current vehicle velocity and the current accelerator pedal opening of the vehicle.

Optionally, corresponding to the driving force mapping information, the driving power mapping information includes first driving power mapping information, second driving power mapping information, third driving power mapping information and fourth driving power mapping information, wherein contents corresponding to the four types of driving power mapping information are expressed in the following four tables, wherein x: accelerator pedal opening (%); y: vehicle velocity (km/h); f: driving power (kW):

TABLE 2-1

| | | | | | | | First driving power table corresponding to the first driving power mapping information | | | | | | | | |
| --- | --- | --- | --- | --- | --- | --- | --- | --- | --- | --- | --- | --- | --- | --- | --- |
| xyf | 1 | 2 | 3 | 5 | 10 | 20 | 25 | 30 | 40 | 50 | 60 | 80 | 100 | 120 | 140 |
| 0 | 0 | 0 | 0 | 0 | −2 | −2 | −2 | −3 | −3 | −4 | −5 | −6 | −8 | −9 | −11 |
| 10 | 0.1 | 0.1 | 0.2 | 0.3 | 0.7 | 1.4 | 2.1 | 2.8 | 3.3 | 3.5 | 3.5 | 3.5 | 3.5 | 3.5 | 3.5 |
| 15 | 0.2 | 0.3 | 0.5 | 0.8 | 1.5 | 3 | 3.9 | 4.7 | 6.5 | 7.4 | 8.2 | 8.9 | 8.9 | 8.9 | 8.9 |
| 20 | 0.3 | 0.5 | 0.8 | 1.4 | 2.7 | 5.5 | 7.7 | 10 | 11.7 | 12.8 | 13.5 | 14.9 | 16 | 16 | 16 |
| 25 | 0.5 | 1 | 1.6 | 2.6 | 5.2 | 10.4 | 13.8 | 17.2 | 20.5 | 23 | 23.4 | 24.1 | 24.8 | 24.8 | 24.8 |
| 30 | 0.8 | 1.6 | 2.4 | 3.9 | 7.9 | 15.7 | 21.8 | 27.8 | 32.6 | 35.5 | 35.5 | 35.5 | 35.5 | 35.5 | 35.5 |
| 35 | 1.1 | 2.2 | 3.3 | 5.5 | 10.9 | 21.9 | 29.5 | 37.2 | 43.6 | 47.5 | 47.5 | 47.5 | 52.5 | 54.2 | 55.9 |
| 40 | 1.7 | 3.5 | 5.2 | 8.7 | 17.4 | 34.9 | 44.7 | 54.5 | 49.4 | 56.9 | 56.9 | 69.5 | 71.1 | 75.8 | 77.4 |
| 50 | 2.3 | 4.6 | 7 | 11.6 | 23.2 | 46.5 | 59.3 | 72.2 | 88.1 | 97 | 98.5 | 105.2 | 110.9 | 120.3 | 116.5 |

TABLE 2-1-continued

| | First driving power table corresponding to the first driving power mapping information | | | | | | | | | | | | | | |
|---|---|---|---|---|---|---|---|---|---|---|---|---|---|---|---|
| xyf | 1 | 2 | 3 | 5 | 10 | 20 | 25 | 30 | 40 | 50 | 60 | 80 | 100 | 120 | 140 |
| 60 | 3.7 | 7.5 | 11.2 | 18.7 | 37.4 | 74.8 | 95.4 | 116.1 | 129 | 138.5 | 143.2 | 152.6 | 157.2 | 165.7 | 168.3 |
| 70 | 5.3 | 10.7 | 16 | 26.7 | 53.3 | 106.7 | 133.3 | 160 | 170 | 180 | 188 | 200 | 200 | 200 | 200 |
| 80 | 7.3 | 14.7 | 22 | 36.7 | 73.3 | 146.7 | 183.3 | 220 | 220 | 220 | 220 | 220 | 220 | 220 | 220 |
| 90 | 7.3 | 14.7 | 22 | 36.7 | 73.3 | 146.7 | 183.3 | 220 | 220 | 220 | 220 | 220 | 220 | 220 | 220 |
| 100 | 7.3 | 14.7 | 22 | 36.7 | 73.3 | 146.7 | 183.3 | 220 | 220 | 220 | 220 | 220 | 220 | 220 | 220 |

TABLE 2-2

| | Second driving power table corresponding to the second driving power mapping information | | | | | | | | | | | | | | |
|---|---|---|---|---|---|---|---|---|---|---|---|---|---|---|---|
| xyf | 1 | 2 | 3 | 5 | 10 | 20 | 25 | 30 | 40 | 50 | 60 | 80 | 100 | 120 | 140 |
| 0 | 0 | 0 | 0 | 0 | −2 | −2 | −2 | −3 | −3 | −4 | −5 | −6 | −8 | −9 | −11 |
| 10 | 0.2 | 0.3 | 0.5 | 0.7 | 1.4 | 2.2 | 1.9 | 1.7 | 1.9 | 2.2 | 2.3 | 2.5 | 2.7 | 2.7 | 2.7 |
| 15 | 0.3 | 0.5 | 0.8 | 1.2 | 2.3 | 2.7 | 2.8 | 2.8 | 3.8 | 4.6 | 5.3 | 6.3 | 6.7 | 6.7 | 6.7 |
| 20 | 0.4 | 0.8 | 1.2 | 1.8 | 3.4 | 4.1 | 4.8 | 5.4 | 6.7 | 8.5 | 9.5 | 11.5 | 13 | 13 | 13 |
| 25 | 0.7 | 1.3 | 1.9 | 2.9 | 5.5 | 6.6 | 8.8 | 11.1 | 12.7 | 15.1 | 16.4 | 18.5 | 20.1 | 20.1 | 20.1 |
| 30 | 0.9 | 1.7 | 2.5 | 3.8 | 7.2 | 8.6 | 12.6 | 16.7 | 18.9 | 21.8 | 23.2 | 25.4 | 26.8 | 26.8 | 26.8 |
| 35 | 1.2 | 2.5 | 3.5 | 5.4 | 10.3 | 12.3 | 16.9 | 21.5 | 23.9 | 27 | 28.7 | 31.4 | 33.1 | 33.1 | 33.1 |
| 40 | 1.6 | 3.2 | 4.6 | 7 | 13.3 | 14.9 | 21.3 | 27.7 | 30.5 | 38.9 | 36 | 39.3 | 41.3 | 41.5 | 41.5 |
| 50 | 2.8 | 5.6 | 8 | 12.2 | 23.2 | 39.1 | 43.3 | 47.4 | 51.4 | 55.7 | 65.1 | 64.6 | 67.6 | 68.1 | 68.1 |
| 60 | 3.2 | 6.4 | 9.5 | 15.9 | 31.8 | 63.7 | 65.4 | 67.2 | 72.2 | 77.6 | 82.4 | 90 | 93.9 | 94.7 | 94.7 |
| 70 | 3.2 | 6.4 | 9.5 | 15.9 | 31.8 | 63.7 | 79.6 | 95.5 | 102.3 | 109.3 | 116 | 126.7 | 132.1 | 133.4 | 133.4 |
| 80 | 4.8 | 9.6 | 14.4 | 24 | 48 | 96 | 120 | 144 | 154 | 164 | 174 | 190 | 198 | 200 | 200 |
| 90 | 6.7 | 13.3 | 20 | 33.3 | 66.7 | 133.3 | 166.7 | 200 | 220 | 220 | 220 | 220 | 220 | 220 | 220 |
| 100 | 6.7 | 13.3 | 20 | 33.3 | 66.7 | 133.3 | 166.7 | 200 | 220 | 220 | 220 | 220 | 220 | 220 | 220 |

TABLE 2-3

| | Third driving power table corresponding to the third driving power mapping information | | | | | | | | | | | | | | |
|---|---|---|---|---|---|---|---|---|---|---|---|---|---|---|---|
| xyf | 1 | 2 | 3 | 5 | 10 | 20 | 25 | 30 | 40 | 50 | 60 | 80 | 100 | 120 | 140 |
| 0 | 0 | 0 | 0 | 0 | −2 | −2 | −2 | −3 | −3 | −4 | −5 | −6 | −8 | −9 | −11 |
| 10 | 0.2 | 0.3 | 0.5 | 0.7 | 1.4 | 2.5 | 3 | 3.6 | 4 | 4.6 | 5 | 5.3 | 5.3 | 5.3 | 5.3 |
| 15 | 0.4 | 0.7 | 1.1 | 1.6 | 3.1 | 5.5 | 7.6 | 9.6 | 10.7 | 12.3 | 13.4 | 14.2 | 14.2 | 14.2 | 14.2 |
| 20 | 0.7 | 1.5 | 2.1 | 3.2 | 6.2 | 11.1 | 13.9 | 16.8 | 18.8 | 21.5 | 23.5 | 24.8 | 24.8 | 24.8 | 24.8 |
| 25 | 1.3 | 2.6 | 3.8 | 5.7 | 10.9 | 21.9 | 22.9 | 24 | 26.8 | 30.7 | 33.5 | 35.5 | 35.5 | 35.5 | 35.5 |
| 30 | 2.1 | 4.1 | 5.9 | 9 | 17.1 | 34.2 | 32.8 | 31.5 | 37.8 | 43.2 | 47.2 | 53.3 | 56.6 | 63.3 | 69.9 |
| 35 | 2.9 | 5.7 | 8.3 | 12.6 | 23.9 | 47.9 | 46.7 | 45.6 | 53.6 | 61.3 | 67.8 | 77.6 | 91.1 | 104.6 | 104.6 |
| 40 | 3.8 | 7.4 | 10.6 | 16.2 | 30.8 | 57.4 | 63.5 | 69.6 | 78 | 89.1 | 99.4 | 115.4 | 140.1 | 156.6 | 152.5 |
| 50 | 5 | 10 | 15 | 23.8 | 45.4 | 95.3 | 102.6 | 109.8 | 119 | 132.1 | 144.7 | 161.9 | 173.1 | 180.5 | 178.6 |
| 60 | 5 | 10 | 15 | 25 | 50 | 95.6 | 122.8 | 150 | 160 | 175 | 190 | 200 | 200 | 200 | 200 |
| 70 | 5 | 10 | 15 | 25 | 50 | 100 | 160 | 220 | 220 | 220 | 220 | 220 | 220 | 220 | 220 |
| 80 | 7.3 | 14.7 | 22 | 36.7 | 73.3 | 146.7 | 183.3 | 220 | 220 | 220 | 220 | 220 | 220 | 220 | 220 |
| 90 | 7.3 | 14.7 | 22 | 36.7 | 73.3 | 146.7 | 183.3 | 220 | 220 | 220 | 220 | 220 | 220 | 220 | 220 |
| 100 | 7.3 | 14.7 | 22 | 36.7 | 73.3 | 146.7 | 183.3 | 220 | 220 | 220 | 220 | 220 | 220 | 220 | 220 |

TABLE 2-4

| | Fourth driving power table corresponding to the fourth driving power mapping information | | | | | | | | | | | | | | |
|---|---|---|---|---|---|---|---|---|---|---|---|---|---|---|---|
| xyf | 1 | 2 | 3 | 5 | 10 | 20 | 25 | 30 | 40 | 50 | 60 | 80 | 100 | 120 | 140 |
| 0 | 0 | 0 | 0 | 0 | −2 | −2 | −2 | −3 | −3 | −4 | −5 | −6 | −8 | −9 | −11 |
| 10 | 0.1 | 0.2 | 0.3 | 0.4 | 0.8 | 1.5 | 2 | 3 | 3 | 3 | 4 | 4 | 4 | 4 | 4 |
| 15 | 0.2 | 0.5 | 0.7 | 1.1 | 2.1 | 3.7 | 5 | 7 | 7 | 8 | 9 | 9 | 9 | 9 | 9 |
| 20 | 0.5 | 1 | | 1.4 | 2.2 | 4.2 | 7.5 | 10 | 12 | 13 | 14 | 16 | 17 | 17 | 17 | 17 |
| 25 | 0.8 | 1.6 | 2.3 | 3.5 | 6.6 | 12 | 15 | 18 | 20 | 22 | 25 | 26 | 26 | 26 | 26 |
| 30 | 1.3 | 2.6 | 3.7 | 5.7 | 10.8 | 19.4 | 23 | 26 | 29 | 32 | 35 | 37 | 37 | 37 | 37 |
| 35 | 1.7 | 3.5 | 5 | 7.6 | 14.5 | 26.2 | 31 | 36 | 41 | 45 | 49 | 54 | 56 | 57 | 59 |
| 40 | 2.3 | 4.6 | 6.6 | 10 | 19.1 | 34.4 | 41 | 47 | 52 | 58 | 65 | 70 | 74 | 80 | 85 |
| 50 | 3.5 | 7 | 10 | 15.3 | 29.1 | 52.4 | 60 | 68 | 78 | 86 | 95 | 104 | 111 | 118 | 122 |

TABLE 2-4-continued

| Fourth driving power table corresponding to the fourth driving power mapping information | | | | | | | | | | | | | | |
| xyf | 1 | 2 | 3 | 5 | 10 | 20 | 25 | 30 | 40 | 50 | 60 | 80 | 100 | 120 | 140 |
|---|---|---|---|---|---|---|---|---|---|---|---|---|---|---|---|
| 60 | 6 | 12 | 17.2 | 26.2 | 49.9 | 89.8 | 97 | 104 | 119 | 128 | 137 | 152 | 156 | 159 | 161 |
| 70 | 8 | 16 | 22.9 | 34.9 | 66.5 | 133 | 136 | 140 | 160 | 170 | 180 | 200 | 200 | 200 | 200 |
| 80 | 8 | 16 | 22.9 | 34.9 | 66.5 | 133 | 166 | 200 | 220 | 220 | 220 | 220 | 220 | 220 | 220 |
| 90 | 8 | 16 | 22.9 | 34.9 | 66.5 | 133 | 166 | 200 | 220 | 220 | 220 | 220 | 220 | 220 | 220 |
| 100 | 8 | 16 | 22.9 | 34.9 | 66.5 | 133 | 166 | 200 | 220 | 220 | 220 | 220 | 220 | 220 | 220 |

Table 1-1 can be obtained according to Table 2-1 and equation (1), Table 1-2 can be obtained according to Table T-2 and equation (1), Table 1-3 can be obtained according to table T-3 and equation (1), Table 1-4 can be obtained according to Table 2-4 and equation (1).

Optionally, a driving power table can be divided into a zero-throttle zone, a starting zone, a constant power zone, a maximum power zone, a zone between constant power and maximum power, and a zone above maximum power, which is conducive to better describing the manner of collecting data in the driving power table and reflecting beneficial effects of the present application. Among them, the zero-throttle zone corresponds to a zone where the accelerator pedal opening in the driving power table is 0. When collecting data in the zero-throttle zone, a driving condition in the zero-throttle zone is required to meet the following requirements: on the one hand, the feeling of deceleration to frequently step on the brake to control the vehicle velocity, which is not conducive to fuel consumption; on the other aspect, when the vehicle is in a pure electric mode, a moving forward trend of the vehicle should be moderate when shifting down from the fourth gear two the second gear when taxiing at high velocity, so that the driving experience of the driver can be ensured to be good.

Starting zone: the starting zone corresponds to a zone where the vehicle velocity is 1-20 km/h in the driving power table, and the driving power in this zone can be obtained according to $P=F \times V=m \times a \times V$, where m—mass of the vehicle and a—acceleration. A target acceleration of each accelerator pedal opening can be preset as required. Optionally, target acceleration tables corresponding to the starting zones of the four kinds of driving power tables described above are as follows:

TABLE 3-1

| First target acceleration table corresponding to the first driving power table | | | | | | | | | | | | | |
|---|---|---|---|---|---|---|---|---|---|---|---|---|---|
| Accelerator pedal opening (%) | 10 | 15 | 20 | 25 | 30 | 35 | 40 | 50 | 60 | 70 | 80 | 90 | 100 |
| Acceleration (m/s2) | 0.10 | 0.22 | 0.40 | 0.76 | 1.15 | 1.60 | 2,50 | 3.40 | 5.47 | 7.67 | 7.67 | 7.67 | 7.67 |

TABLE 3-2

| Second target acceleration table corresponding to the second driving power table | | | | | | | | | | | | | |
|---|---|---|---|---|---|---|---|---|---|---|---|---|---|
| Accelerator pedal opening (%) | 10 | 15 | 20 | 25 | 30 | 35 | 40 | 50 | 60 | 70 | 80 | 90 | 100 |
| Acceleration (m/s2) | 0.1 | 0.2 | 0.33 | 0.5 | 0.8 | 1.05 | 1.5 | 1.95 | 3.4 | 5.47 | 7.67 | 7.67 | 7.67 |

TABLE 3-3

| Third target acceleration table corresponding to the third driving power table | | | | | | | | | | | | | |
|---|---|---|---|---|---|---|---|---|---|---|---|---|---|
| Accelerator pedal opening (%) | 10 | 15 | 20 | 25 | 30 | 35 | 40 | 50 | 60 | 70 | 80 | 90 | 100 |
| Acceleration (m/s2) | 0.2 | 0.45 | 0.9 | 1.6 | 2.5 | 3.5 | 4.5 | 6.64 | 7.6 | 7.6 | 7.6 | 7.6 | 7.6 |

TABLE 3-4

| Fourth target acceleration table corresponding to the fourth driving power table | | | | | | | | | | | | | |
|---|---|---|---|---|---|---|---|---|---|---|---|---|---|
| Accelerator pedal opening(%) | 10 | 15 | 20 | 25 | 30 | 35 | 40 | 50 | 60 | 70 | 80 | 90 | 100 |
| Acceleration (m/s2) | 0.1 | 0.25 | 0.5 | 0.8 | 1.3 | 1.75 | 2.3 | 3.5 | 6 | 7.6 | 7.6 | 7.6 | 7.6 | should be moderate, too aggressive deceleration may be beneficial for energy recovery but will urge the driver to frequently step on the accelerator pedal to keep the vehicle velocity, which is not conductive to driving experience, while a too weak feeling of deceleration will urge the driver Constant power zone: generally, a selected accelerator pedal opening is 30%, and a zone determined based on the accelerator pedal opening of 30% is the constant power zone. According to a power balance function, the vehicle's driving power of at 100 KPH is multiplied by a certain coefficient as the value of constant power, for example, the corresponding constant power in the first drive mode=37 kW (the vehicle's driving power at 100 kph)×0.958 (coefficient) =35.5 kW. Optionally, the corresponding constant power in the second drive mode is 26.8 kw. The corresponding constant power in the third drive mode is 35.5 kw, and the accelerator pedal opening of 25% is selected as a constant power point in the third drive mode.

Maximum power zone: in the same way as the method of collecting data of the constant power zone described above, the accelerator pedal opening of the maximum power zone in the first drive mode and a highland environment is 70%, the accelerator pedal opening of the maximum power zone in the second drive mode is 80%, and the accelerator pedal opening of the maximum power zone in the third drive mode is 60%.

The zone between constant power and maximum power: it is obtained according to a certain proportion difference. Optionally, the driving power of this zone is determined by using linear difference.

The zone above maximum power: the driving power of this zone is equal to the maximum power plus 20.

From the description above, it may be known that the requested driving force needs to be determined according to the gear status, the altitude data and the drive mode of the vehicle in the present application. Optionally, the gear status of the vehicle can be divided into two situations: first, the gear status of the vehicle is that the vehicle is not in the parking gear or the neutral gear, that is, the vehicle is in the forward gear or reverse the gear; second, the gear status of the vehicle is that the vehicle is in the parking gear or the neutral gear. Therefore, optionally, a control process of the requested driving force in the present application at least includes the following three situations: the first situation is that the vehicle is not in the parking gear or the neutral gear and the vehicle is on a flatland (the altitude data is less than the preset altitude data); the second situation is that the vehicle is not in the parking gear or the neutral gear, and the vehicle is on a highland (the altitude data is greater than or equal to the preset altitude); the third situation is that the vehicle is in the parking gear or the neutral gear.

The following description is based on the first situation. In an optional embodiment, after step S201, the method includes:

S202: acquiring altitude data and a drive mode of the vehicle if the gear status is that the vehicle is not in a parking gear or a neutral gear.

Optionally, the altitude data of the vehicle can be collected by the altitude monitor module mentioned above, and can also be determined by acquiring current geographic location information through networking. For example, if the vehicle is located in Tibet of China, the altitude data can be directly set to a relative high altitude value.

Optionally, the drive modes can be the three drive modes mentioned above and classified according to fuel consumption: the first drive mode, the second drive mode and the third drive mode, and the drive modes can also be classified according to vehicle velocity or acceleration response efficiency or a combination thereof as required.

S203: determining a requested driving force of the vehicle based on the current vehicle velocity, the current accelerator pedal opening, the drive mode and the driving force mapping information if the altitude data is less than a preset altitude.

That is, when the vehicle is in a flatland environment, a corresponding driving force table can be determined directly based on the drive mode obtained in step S201, and then the requested driving force can be determined from the driving force table according to the current vehicle velocity and the current accelerator pedal opening.

In an optional embodiment, determining the requested driving force of the vehicle based on the current vehicle velocity, the current accelerator pedal opening, the drive mode and the driving force mapping information in step S203 includes: determining target driving force mapping information according to the drive mode and the driving force mapping information; determining the requested driving force of the vehicle based on the current vehicle velocity, the current accelerator pedal opening and the target driving force mapping information if the target driving force mapping information is corresponding driving force mapping information in the first drive mode.

Optionally, the target driving force mapping information is the first driving force table 1-1 above. Certainly, if the target driving force mapping information is the corresponding driving force mapping information in the second drive mode, the third drive mode or the highland environment, the target driving force mapping information can also be the second driving force table 1-2, the third driving force table 1-3 or the fourth driving force table 1-4 above.

In another optional embodiment, as shown in FIG. 3, FIG. 3 is a flow diagram of another optional method for determining a requested driving force according to the present application. After determining the target driving force mapping information according to the drive mode and the driving force mapping information described above, the method further includes:

S301: acquiring first accelerator pedal correction mapping information if the target driving force mapping information is corresponding driving force mapping information in second drive mode; the first accelerator pedal correction mapping information represents a corresponding relationship among a vehicle velocity, an accelerator pedal opening and a corrected accelerator pedal opening in the second drive mode, and fuel consumption in the second drive mode is less than that in the first drive mode.

In the present embodiment, the fuel consumption in the second drive mode is less than that in the first drive mode, and the accelerator pedal correction mapping information in the first drive mode is defined as initial accelerator pedal correction mapping information. When the vehicle is in the second drive mode, correction is performed by using the accelerator pedal opening of the first drive mode as the basic data, such that the two drive modes can be distinguished by difference of accelerator pedal openings at the same vehicle velocity, so as to achieve different driving effects. The contents corresponding to the two types of accelerator pedal correction mapping information described above can be as shown in the following 2 tables, where x: accelerator pedal opening (%); y: vehicle velocity (km/h); z: corrected accelerator pedal opening (%):

TABLE 4-1

| First accelerator pedal correction table corresponding to initial accelerator pedal correction mapping information | | | | | |
|---|---|---|---|---|---|
| xyz | 0 | 10 | 60 | 100 | 150 |
| 0 | 0 | 0 | 0 | 0 | 0 |
| 10 | 10 | 10 | 10 | 10 | 10 |
| 20 | 20 | 20 | 20 | 20 | 20 |
| 30 | 30 | 30 | 30 | 30 | 30 |
| 40 | 40 | 40 | 40 | 40 | 40 |
| 50 | 50 | 50 | 50 | 50 | 50 |

TABLE 4-1-continued

| First accelerator pedal correction table corresponding to initial accelerator pedal correction mapping information | | | | | |
|---|---|---|---|---|---|
| xyz | 0 | 10 | 60 | 100 | 150 |
| 60 | 60 | 60 | 60 | 60 | 60 |
| 70 | 70 | 70 | 70 | 70 | 70 |
| 80 | 80 | 80 | 80 | 80 | 80 |
| 90 | 90 | 90 | 90 | 90 | 90 |
| 100 | 100 | 100 | 100 | 100 | 100 |

TABLE 4-2

| First accelerator pedal correction table corresponding to the first accelerator pedal correction mapping information | | | | | |
|---|---|---|---|---|---|
| xyz | 0 | 10 | 60 | 100 | 150 |
| 0 | 0 | 0 | 0 | 0 | 0 |
| 10 | 5.05 | 5.48 | 5.91 | 6.35 | 7.24 |
| 20 | 11.11 | 11.92 | 12.74 | 13.56 | 15.20 |
| 30 | 18.29 | 19.41 | 20.55 | 21.67 | 23.85 |
| 40 | 26.67 | 28.03 | 29.37 | 30.68 | 33.20 |
| 50 | 36.31 | 37.77 | 39.20 | 40.59 | 43.19 |
| 60 | 47.19 | 48.61 | 49.99 | 51.32 | 53.77 |
| 70 | 59.22 | 60.46 | 61.64 | 62.78 | 64.86 |
| 80 | 72.21 | 73.13 | 74.01 | 74.84 | 76.34 |
| 90 | 85.92 | 86.41 | 86.87 | 87.31 | 88.10 |
| 100 | 100 | 100 | 100 | 100 | 100 |

Optionally, determining the requested driving force of the vehicle based on the current vehicle velocity, the current accelerator pedal opening and the target driving force mapping information if the target driving force mapping information is the corresponding driving force mapping information in the first drive mode includes: acquiring initial accelerator pedal correction mapping information if the target driving force mapping information is the corresponding driving force mapping information in the first drive mode; wherein the initial accelerator pedal correction mapping information represents a corresponding relationship among a vehicle velocity, an accelerator pedal opening and a corrected accelerator pedal opening in the first drive mode; determining an initial corrected accelerator pedal opening according to the current vehicle velocity, the current accelerator pedal opening and the initial accelerator pedal correction mapping information; determining the requested driving force of the vehicle based on the current vehicle velocity, the initial corrected accelerator pedal opening and the target driving force mapping information. Optionally, after the drive mode is determined to be the first drive mode, the initial corrected accelerator pedal opening can be determined from Table 4-1 according to the current vehicle velocity and the current accelerator pedal opening, and then the requested driving force can be obtained.

S302: determining a first corrected accelerator pedal opening according to the current vehicle velocity, the current accelerator pedal opening and the first accelerator pedal correction mapping information.

Optionally, the first corrected accelerator pedal opening can be determined from Table 4-2 described above according to the current vehicle velocity and the current accelerator pedal opening.

S303: determining the requested driving force of the vehicle based on the current vehicle velocity, the first corrected accelerator pedal opening and the target driving force mapping information.

In another optional embodiment, as shown in FIG. 4, FIG. 4 is a flow diagram of another optional method for determining a requested driving force according to the present application. After determining the target driving force mapping information according to the drive mode and the driving force mapping information described above, the method further includes:

S401: acquiring second accelerator pedal correction mapping information if the target driving force mapping information is corresponding driving force mapping information in the third drive mode; wherein the second accelerator pedal correction mapping information represents a corresponding relationship among a vehicle velocity, an accelerator pedal opening and a corrected accelerator pedal opening in the third drive mode, and fuel consumption in the third drive mode is higher than that in the first drive mode;

In the present embodiment, for the same reason described above, the second accelerator pedal correction information is corrected based on the data of accelerator pedal opening in the first drive mode, and the contents corresponding to the second accelerator pedal correction mapping information can be expressed as follows:

TABLE 4-3

| Second accelerator pedal correction table corresponding to the second accelerator pedal correction mapping information | | | | | |
|---|---|---|---|---|---|
| xyz | 0 | 10 | 60 | 100 | 150 |
| 0 | 0 | 0 | 0 | 0 | 0 |
| 10 | 10.5 | 10.5 | 10.5 | 10.5 | 10.5 |
| 20 | 21 | 21 | 21 | 21 | 21 |
| 30 | 31.5 | 31.5 | 31.5 | 31.5 | 31.5 |
| 40 | 42 | 42 | 42 | 42 | 42 |
| 50 | 52.5 | 52.5 | 52.5 | 52.5 | 52.5 |
| 60 | 63 | 63 | 63 | 63 | 63 |
| 70 | 73.5 | 73.5 | 73.5 | 73.5 | 73.5 |
| 80 | 84 | 84 | 84 | 84 | 84 |
| 90 | 94.5 | 94.5 | 94.5 | 94.5 | 94.5 |
| 100 | 100 | 100 | 100 | 100 | 100 |

S402: determining a second corrected accelerator pedal opening according to the current vehicle velocity, the current accelerator pedal opening and the second accelerator pedal correction mapping information.

Optionally, the first corrected accelerator pedal opening can be determined from Table 4-3 described above according to the current vehicle velocity and the current accelerator pedal opening.

S403: determining the requested driving force of the vehicle based on the current vehicle velocity, the second corrected accelerator pedal opening and the target driving force mapping information.

In an optional embodiment, if the gear status is that the vehicle is not in the parking or the neutral gear, after acquiring the altitude data and the drive mode of the vehicle, the method further includes:

if the altitude data is less than a preset altitude and the vehicle is in a switching state between any two modes among the first drive mode, the second drive mode and the third drive mode, determining a requested driving force before switching according to a vehicle velocity in the drive mode before switching, an accelerator pedal opening in the drive mode before switching and the driving force mapping information; determining a requested driving force after switching according to a vehicle velocity in the drive mode after switching, an accelerator pedal opening in the drive mode after switching, the drive mode after switching and the driving force mapping information; determining the requested driving force of the vehicle based on the requested driving force before switching, the requested driving force after switching and a preset interpolation coefficient. For example, when the vehicle is switched from the first drive mode to the second drive mode, a first driving force and a second driving force are determined from Table 1-1 and Table 1-2 according to the current vehicle velocity and the current accelerator pedal opening, the requested driving force can be calculated by the equation $F=F1\times(1-R)+F2\times R$, where Optionally, in the present embodiment, driving manners of the vehicle include engine driving, co-driving of engine-electric motor. Certainly, in the actual environment, the driving manners of the vehicle also include pure electric motor driving. When the driving manner of the vehicle is pure electric motor driving, the requested driving force can be determined from Table 1-4 described above based on the current vehicle velocity and the accelerator pedal opening.

Optionally, the mapping information of the upper limit of the initial engine torque can be contents in the following table:

TABLE 5

| Table of upper limit of initial engine torque | | | | | | | | | | | | | | | | | |
|---|---|---|---|---|---|---|---|---|---|---|---|---|---|---|---|---|---|
| Revolution speed level | | | | | | | | | | | | | | | | | |
| 0 | 1 | 2 | 3 | 4 | 5 | 6 | 7 | 8 | 9 | 10 | 11 | 12 | 13 | 14 | 15 | 16 | 17 |
| Engine revolution speed (rpm) | | | | | | | | | | | | | | | | | |
| 750 | 1000 | 1250 | 1500 | 2000 | 2500 | 3000 | 3500 | 4000 | 4500 | 5000 | 5500 | 8000 | 8300 | 6700 | 7000 | 7200 | 7500 |
| Upper limit value of initial engine torque (n) | | | | | | | | | | | | | | | | | |
| 93 | 93 | 111 | 129 | 165 | 196 | 196 | 196 | 196 | 185 | 175 | 146 | 111 | 112 | 113 | 114 | 115 | 116 |

F—requested driving force; F1—first driving force; F2—second driving force; R—interpolation coefficient.

Optionally, a range of the preset interpolation coefficient is from 0 to 1, and the interpolation coefficient is positively correlated with time. For example, a relationship between the interpolation coefficient and time can be as follows: $R=kt$, where k is the coefficient, t is time with a unit in second. When k is 0.4, a value of the preset interpolation coefficient can be 0, 0.4, 0.8, and 1 in sequence. Certainly, the relationship between the interpolation coefficient and time can also be set as $r=kt+a$ according to needs, where a is a constant. The value of the preset interpolation coefficient is continually increased by employing the manner described above, such that the requested driving force is in a process with gradual change during a process in which the vehicle is switched from the first drive mode to the second drive mode, thus the driving stability, comfort and safety of the vehicle are improved.

Similarly, if the vehicle is in a switching state of other drive modes, the calculation process of its requested driving force refers to the calculation process of switching from the first drive mode to the second drive mode described above.

The above description is based on the first situation, that is, the method for determining the requested driving force of the vehicle when the vehicle is not in the parking gear or the neutral gear and the vehicle is in a flatland environment. The following will be described based on the second situation. In another optional embodiment, as shown in FIG. 5, FIG. 5 is a flow diagram of another optional method for determining a requested driving force according to the present application. After step S202, the method further includes:

S501: acquiring a current engine revolution speed and mapping information of upper limit of initial engine torque of the vehicle if the altitude data is greater than or equal to the preset altitude, and the driving manner of the vehicle is engine driving, wherein the mapping information of the upper limit of the initial engine torque represents a corresponding relationship among coefficient revolution speed level, a preset engine revolution speed and an upper limit value of the initial engine torque.

It should be noted that the revolution speed level can be 18 or 19, etc. as required, and the upper limit value of the initial engine torque is maximum torque corresponding to a preset engine revolution speed when the vehicle is on a flatland.

S502: determining a current revolution speed level and a preset engine revolution speed which is currently selected according to the current engine revolution speed and the mapping information of the upper limit of the initial engine torque.

Optionally, a preset engine revolution speed closest to the current engine revolution speed can be determined from Table 5 according to the current engine revolution speed and determined as the preset engine revolution speed which is currently selected, and a revolution speed level corresponding to the preset engine revolution speed which is currently selected is the current revolution speed level. For example, if the current engine revolution speed is 1200 rpm, the determined preset engine revolution speed currently selected is 1250 rpm, and the current revolution speed level is 2.

S503: determining a current upper limit value of the initial engine torque according to the current engine revolution speed and the mapping information of the upper limit of the initial engine torque if the vehicle meets preset conditions.

In an optional embodiment, before step S503, the method further includes: acquiring actual engine torque and an upper limit value of the actual engine torque; wherein the preset conditions include: an average change rate of the engine revolution speed is less than 700 rpm; the actual engine torque is greater than 10 Nm; the upper limit value of actual engine torque is greater than 0; a difference between the preset engine revolution speed which is currently selected and the current engine revolution speed is less than 50 rpm, such that a deviation between the finally corresponding upper limit value of the initial engine torque and the actual value is not great; and the current revolution speed level is determined according to a historical revolution speed level.

Optionally, the historical revolution speed level can be coefficient revolution speed level in the previous cycle, or can be determined by mathematical manners such as averaging revolution speed levels within the preset number of closest cycles.

It should be noted that the preset conditions described above are set to ensure that the engine revolution speed does not fluctuate greatly and the driving is relatively stable during the current driving process of the vehicle. Therefore, the preset conditions described above can be other parameters and limits according to situations with different types of vehicles.

S504: acquiring an upper limit value of torque for high-altitude corresponding to the current engine revolution speed;

In the present embodiment, the upper limit value of torque for high-altitude can be obtained by collecting from the engine through a torque collecting device, or can be preset or obtained based on historical data.

S505: determining a torque deviation value according to a current upper limit value of the initial engine torque and a corresponding upper limit value of torque for high-altitude at the current engine revolution speed, wherein the torque deviation value is positively correlated with time.

Optionally, the torque deviation value is equal to the upper limit value of torque for high-altitude corresponding to the current engine revolution speed minus the current upper limit value of the initial engine torque. If the torque deviation value between the current upper limit value of the initial engine torque and the upper limit value of torque for high-altitude corresponding to the current engine revolution speed is negative, an absolute value of the difference between them is taken as the torque deviation value. Optionally, in order to better explain a relationship between the torque deviation value and time, the torque deviation value is set as r, a value range of r is 0–r, r=kt, where k is a coefficient, t is time with unit in second.

S506: determining a current upper limit value of torque for high-altitude according to the torque deviation value and the current upper limit value of the initial engine torque.

S507: determining an attenuation coefficient according to the current upper limit value of torque for high-altitude and the current upper limit value of the initial engine torque.

Optionally, the ratio of the current upper limit value of torque for high-altitude to the current upper limit value of the initial engine torque can be taken as the attenuation coefficient. Since the torque deviation value is positively correlated with time, the attenuation coefficient is also positively correlated with time.

S508: determining the requested driving force of the vehicle according to the attenuation coefficient, the current vehicle velocity, the current accelerator pedal opening and the driving force mapping information.

In an optional embodiment, step S508 includes:

determining a flatland driving force in the current drive mode according to the current vehicle velocity, the current accelerator pedal opening and the driving force mapping information; determining a highland driving force according to the current vehicle velocity, the current accelerator pedal opening and the driving force mapping information; obtaining the requested driving force according to the flatland driving force, the highland driving force and the attenuation coefficient in the current drive mode.

Optionally, the driving force determined from Table 1-1, Table 1-2 or Table 1-3 according to the current vehicle velocity and the current accelerator pedal opening is the flatland driving force, and the driving force determined from Table 1-4 according to the current vehicle velocity and the current accelerator pedal opening is the highland driving force.

Optionally, the determination of the requested driving force according to the flatland driving force, the highland driving force and the attenuation coefficient can be done by calculation through equation F=Fg×(1–m)+Fn×m; where F—requested driving force; Fg—highland driving force; Fn—flatland driving force; m—attenuation coefficient.

In an optional embodiment, after step S502, the method further includes: determining the requested driving force according to the current vehicle velocity, the current accelerator pedal opening and the driving force mapping information if the vehicle does not meet the preset conditions.

That is, the requested driving force is determined from Table 1-4 according to the current vehicle velocity and the current accelerator pedal opening if the vehicle does not meet the above preset conditions. Certainly, even if the altitude data is greater than or equal to the preset altitude, the requested driving force can be obtained directly based on this method as required.

It should be noted that steps S501-S508 are obtained by calculation based on the self-judgment of the vehicle according to step S201. Obtaining the requested driving force by the method mentioned above may avoid the problem that the idle traveling distance of the pedal is too long when the acceleration pedal is greatly pressed due to the attenuation of engine torque capacity at high altitude.

The above is the description based on the second situation, that is, the method for determining the requested driving force of the vehicle when the vehicle is not in the parking gear or the neutral gear and the vehicle is in the highland environment, and the following description will be based on the third situation.

Figure 6:
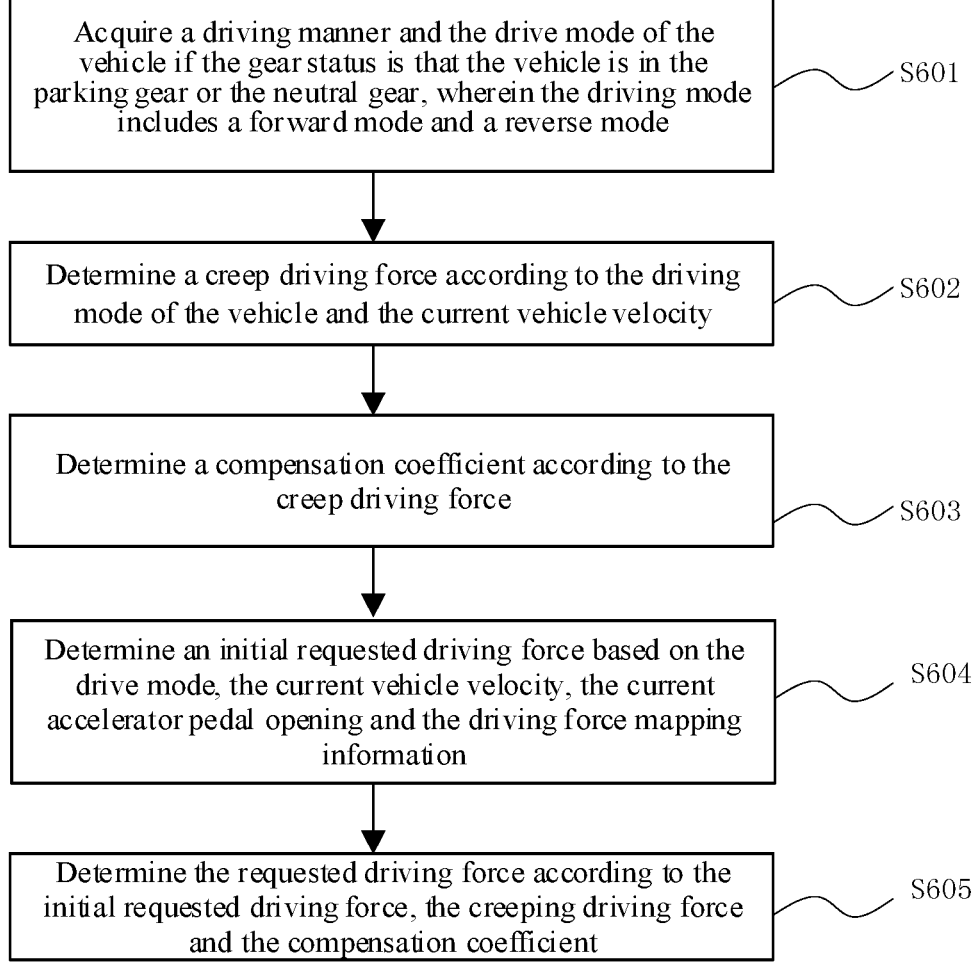
FIG. 6 is a flow diagram of another optional method for determining a requested driving force according to the present application.

In another optional embodiment, as shown in FIG. 6, FIG. 6 is a flow diagram of another optional method for determining a requested driving force according to the present application. After step S201, the method further includes:

S601: acquiring a driving manner and the drive mode of the vehicle if the gear status is that the vehicle is in the parking gear or the neutral gear, wherein the driving mode includes a forward mode and a reverse mode.

S602: determining a creep driving force according to the driving mode of the vehicle and the current vehicle velocity.

Optionally, step S602 includes: acquiring creep driving force mapping information, which represents a corresponding relationship between a vehicle velocity and a creep driving force; determining the creep driving force based on the current vehicle velocity, the driving mode of the vehicle and the creep driving force mapping information.

Optionally, since drive states of the vehicle are different in different driving modes, the creep driving force mapping information can include first creep driving force mapping information and second creep driving force mapping information, wherein the first creep driving force mapping information is creep driving force mapping information in a forward mode and the second creep driving force mapping information is creep driving force mapping information in a reverse mode. Optionally, the contents corresponding to the two kinds of creep driving force mapping information mentioned above can be expressed as follows:

TABLE 6-1

| First creep driving force table corresponding to the first creep driving force mapping information | | | | | | |
|---|---|---|---|---|---|---|
| Vehicle velocity (km/h) | 0 | 1.2 | 3.2 | 3.8 | 4.5 | 5.6 | 6.2 |
| Creep driving force (n) | 1500 | 1500 | 1190 | 1013 | 788 | 274 | 0 |

TABLE 6-2

| First creep driving force table corresponding to the first creep driving force mapping information | | | | | | | |
|---|---|---|---|---|---|---|---|
| Vehicle velocity (km/h) | 0 | 1.2 | 2 | 2.5 | 3 | 3.5 | 4 |
| Creep driving force (n) | 1500 | 1500 | 1300 | 1100 | 792 | 471 | 0 |

Optionally, the creep driving force can be determined from Table 6-1 based on the current vehicle velocity and the current accelerator pedal opening when the vehicle is in the forward mode; the creep driving force can be determined from Table 6-2 based on the current vehicle velocity and the current accelerator pedal opening when the vehicle is in the reverse mode.

S603: determining a compensation coefficient according to the creep driving force.

Optionally, in order to make the vehicle start smoothly with coherently power during a process in which the accelerator is started or the accelerator is released for taxiing to creeping, the compensation coefficient is set for the creep driving force according to a rule that the weighting of the creep driving force is relatively large when the creep driving force is relatively small, and the corresponding weighting gradually decreases as the creep driving force gradually increases. Optionally, a corresponding relationship between the creep driving force and the compensation coefficient can be shown in the following table:

TABLE 7

| Correspondence table of creep driving force and compensation coefficient | | | | |
|---|---|---|---|---|
| Creep driving force (N) | 0 | 1000 | 2000 | 3000 |
| Compensation coefficient | 1 | 0.5 | 0 | 0 |

S604: determining an initial requested driving force based on the drive mode, the current vehicle velocity, the current accelerator pedal opening and the driving force mapping information.

In an optional embodiment, step S604 includes:

determining a target requested driving force according to the current vehicle velocity, the current accelerator pedal opening, the drive mode and the driving force mapping information; determining a lower limit value of a force for coasting according to the drive mode and the current vehicle velocity; determining the lower limit value of the force for coasting as the initial requested driving force if the target requested driving force is less than the lower limit value of the force for coasting.

Optionally, the target requested driving force can be the firstly determined content of the driving force mapping information described above according to the drive mode and the driving force mapping information. For example, if the drive mode is the first drive mode, the driving force mapping information can be determined as the first driving force mapping information, and then the target requested driving force can be determined from Table 1-1 based on the current vehicle velocity and the current accelerator pedal opening.

Optionally, in order to make the requested driving force finally obtained be more accurate, its boundary conditions need to be considered, and the lower limit value of the force for coasting can be determined based on the drive mode and the current vehicle velocity, such that the lower limit value of the force for coasting can be directly determined as the initial requested driving force if the target driving force is less than the lower limit value of the force for coasting. Optionally, as can be known from the above, the drive modes can include three drive modes: the first drive mode, the second drive mode and the third drive mode, and the mapping relationship between the lower limit value of the force for coasting and vehicle velocity in different drive modes can be shown in the following table:

TABLE 7-1

| Lower limit value of first force for coasting in the first drive mode | | | | | | | | | |
|---|---|---|---|---|---|---|---|---|---|
| Vehicle velocity (km/h) | 1 | 7 | 13 | 25 | 38 | 50 | 63 | 76 | 240 |
| lower limit value of force for coasting (n) | 0 | −200 | −270 | −400 | −400 | −350 | −300 | −300 | −300 |

TABLE 7-2

| Lower limit value of second force for coasting in the second drive mode | | | | | | | | | |
|---|---|---|---|---|---|---|---|---|---|
| Vehicle velocity (km/h) | 1 | 7 | 13 | 25 | 38 | 50 | 63 | 76 | 240 |
| Lower limit of force for coasting (n) | 0 | −260 | −351 | −520 | −520 | −455 | −390 | −390 | −390 |

TABLE 7-3

| Lower limit value of third force for coasting in the third drive mode | | | | | | | | | |
|---|---|---|---|---|---|---|---|---|---|
| Vehicle velocity (km/h) | 1 | 7 | 13 | 25 | 38 | 50 | 63 | 76 | 240 |
| Lower limit of force for coasting (n) | 0 | −180 | −243 | −360 | −360 | −315 | −270 | −270 | −270 |

Optionally, when the drive mode is the first drive mode, the lower limit value of the force for coasting can be determined from Table 7-1 based on the current vehicle velocity, and the lower limit value of the force for coasting can be compared with the target requested driving force mentioned above, such that the initial requested driving force is determined.

In an optional embodiment, after determining the lower limit value of the force for coasting according to the driving mode and the current vehicle velocity, the method further includes:

acquiring a wheel driving mode of the vehicle if the target requested driving force is greater than the lower limit value of the force for coasting, wherein the wheel driving mode includes electric motor driving and co-driving of electric motor-engine; determining an upper limit value of driving force according to the wheel driving mode; determining the upper limit value of driving force as the initial requested driving force if the target requested driving force is greater than or equal to the upper limit value of driving force, such that the determined initial requested driving force is enabled to be more accurate.

Optionally, when the wheel driving mode is electric motor driving, the upper limit value of driving force refers to a maximum force at a wheel end that can be provided by the electric motor. When the wheel drive mode is the co-driving of electric motor-engine, the upper limit of driving force refers to the maximum force at the wheel end that can be provided by the electric motor plus a maximum force at the wheel end that can be provided by the engine.

In an optional embodiment, after determining the upper limit value of driving force according to the wheel driving mode of the vehicle, the method further includes:

determining the target requested driving force as the initial requested driving force if the target requested driving force is less than the upper limit value of the driving force.

S605: determining the requested driving force according to the initial requested driving force, the creep driving force and the compensation coefficient.

Optionally, the determination of the requested driving force according to the initial request driving force, the creep driving force and the compensation coefficient can be done by calculation through the equation $F=F_p \times h + F_o$, where F—request driving force; $F_p$—creep driving force; $F_o$—initial request driving force; h—compensation coefficient.

Optionally, the current engine revolution speed, the current accelerator pedal opening and torque mapping information can be obtained when the gear status of the vehicle is that the vehicle is in the neutral gear or the parking gear, and the torque mapping information represents a corresponding relationship among the engine revolution speed, the accelerator pedal opening and the torque, and then the current torque can be determined from the torque mapping information based on the current engine revolution speed and the current accelerator pedal opening, such that the engine revolution speed can be further controlled based on the current torque.

In conclusion, in an optional embodiment, the control unit described above can acquire the gear status of the vehicle first, so as to avoid the problem that the idle traveling distance of the pedal is too long when the accelerator pedal is greatly pressed due to the attenuation of the engine torque capacity in a high-temperature environment. When the gear status of the vehicle is not in the parking gear or the neutral gear, in order to avoid the problem that the idle traveling distance of the pedal is too long when the accelerator pedal is greatly pressed due to the attenuation of the engine torque capacity in a high-altitude environment. The control unit is also required to acquire the altitude data of the vehicle. When the altitude data is less than the preset altitude, that is, the vehicle is on a flatland, in order to improve the driving experience, the control unit is also required to acquire the drive mode of the vehicle and the target driving force mapping information is determined based on the drive mode, such that the control unit is able to subsequently determine the requested driving force from the target driving force mapping information based on the current vehicle velocity and the current accelerator pedal opening.

Figure 7:
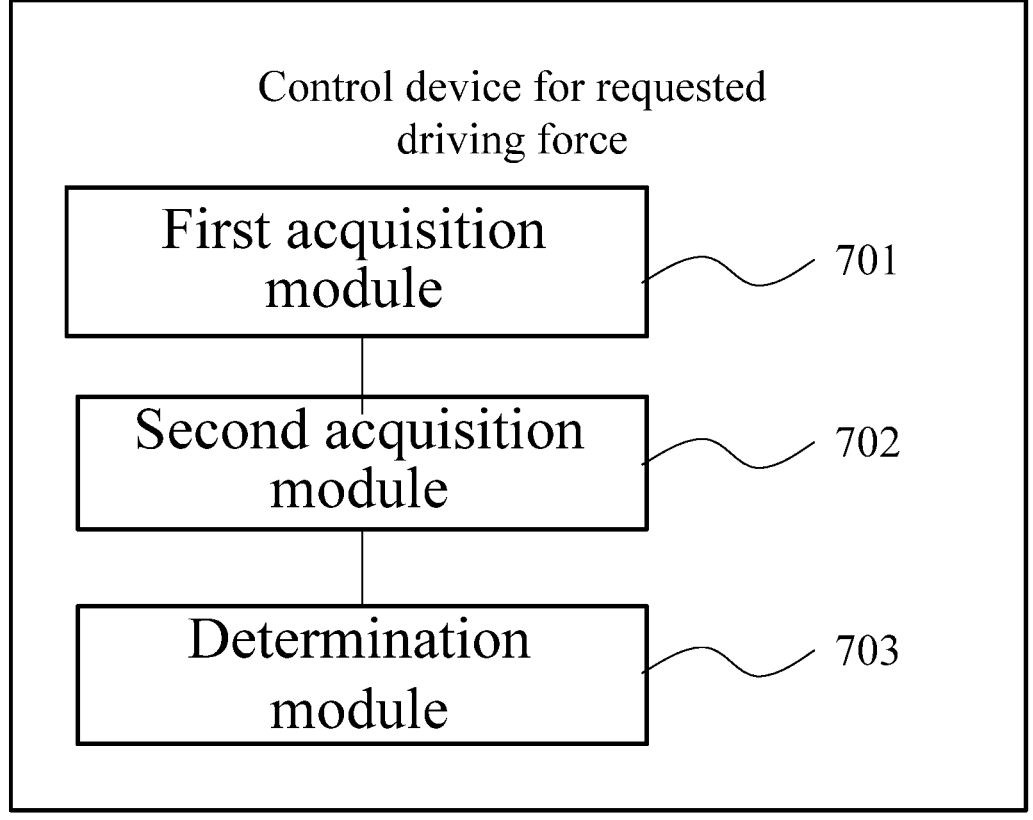
FIG. 7 is a schematic structural diagram of another optional device for determining a requested driving force.

In another aspect, a device for determining a requested driving force is further disclosed in the present application, as shown in FIG. 7, FIG. 7 is a structural schematic diagram of another optional device for determining a requested driving force. The device includes:

a first acquisition module 701, configured to acquire gear status, current vehicle velocity, current accelerator pedal opening and driving force mapping information of the vehicle, wherein the driving force mapping information represents a corresponding relationship among a vehicle velocity, a accelerator pedal opening and a driving force;

a second acquisition module 702, configured to acquire altitude data and a drive mode of the vehicle if the gear status is that the vehicle is not in a parking gear or a neutral gear;

a determination module 703, configured to determine a requested driving force of the vehicle based on the current vehicle velocity, the current accelerator pedal opening, the drive mode and the driving force mapping information if the altitude data is less than a preset altitude.

In an optional embodiment, the device includes: The determination module is further configured to determine a target driving force mapping information according to the drive mode and the driving force mapping information; determine the requested driving force of the vehicle based on the current vehicle velocity, the current accelerator pedal opening and the target driving force mapping information if the target driving force mapping information is corresponding driving force mapping information in a first drive mode.

In an optional embodiment, the device includes:

The first acquisition module is further configured to acquire first accelerator pedal correction mapping information if the target driving force mapping information is corresponding driving force mapping information in a second drive mode; the first accelerator pedal correction mapping information represents a corresponding relationship among the vehicle velocity, the accelerator pedal opening and corrected accelerator pedal opening in the second drive mode, and fuel consumption in the second drive mode is less than that in the first drive mode;

The determination module is further configured to determine a first corrected accelerator pedal opening according to the current vehicle velocity, the current accelerator pedal opening and the first accelerator pedal correction mapping information; determine the requested driving force of the vehicle based on the current vehicle velocity, the first corrected accelerator pedal opening and the target driving force mapping information.

In an optional embodiment, the device includes:

the first acquisition module is further configured to acquire second accelerator pedal correction mapping information if the target driving force mapping information is corresponding driving force mapping information in the third drive mode; the second accelerator pedal correction mapping information represents a corresponding relationship among the vehicle velocity, the accelerator pedal opening and a corrected accelerator pedal opening in the third drive mode, and fuel consumption of the third drive mode is higher than that in the first drive mode;

the determination module is further configured to determine a second corrected accelerator pedal opening according to the current vehicle velocity, the current accelerator pedal opening and the second accelerator pedal correction mapping information; determine the requested driving force of the vehicle based on the current vehicle velocity, the second corrected accelerator pedal opening and the target driving force mapping information.

In an optional embodiment, the device includes:

the determination module is further configured to determine a requested driving force before switching according to a vehicle velocity in a drive mode before switching, an accelerator pedal opening in the drive mode before switching and the driving force mapping information if the altitude data is less than the preset altitude and the vehicle is in the switching state between any two modes among the first drive mode, the second drive mode and the third drive mode; determine a requested driving force after switching according to a vehicle velocity in the drive mode after switching, an accelerator pedal opening in the drive mode after switching, the drive mode after switching and the driving force mapping information; determine the requested driving force of the vehicle based on the requested driving force before switching, the requested driving force after switching and a preset interpolation coefficient.

In an optional embodiment, the preset interpolation coefficient ranges from 0 to 1, and the interpolation coefficient is positively correlated with time.

In an optional embodiment, the device includes:

the first acquisition module is further configured to acquire a current engine revolution speed and mapping information of upper limit of initial engine torque of the vehicle if the altitude data is greater than or equal to the preset altitude and a driving manner of the vehicle is engine driving, wherein the mapping information of the upper limit of initial engine torque represents a corresponding relationship among a revolution speed level, a preset engine revolution speed and the upper limit value of initial engine torque;

the determination module is further configured to determine a current revolution speed level and a preset engine revolution speed which is currently selected according to the current engine revolution speed and the mapping information of the upper limit of initial engine torque;

the second acquisition module is further configured to determine a current upper limit value of the initial engine torque according to the mapping information of the current engine revolution speed and the upper limit of initial engine torque if the vehicle meets preset conditions; and acquire a corresponding upper limit value of torque for high-altitude at the current engine revolution speed;

the determination module is further configured to determine a torque deviation value according to the current upper limit value of initial engine torque and the corresponding upper limit value of torque for high-altitude at the current engine revolution speed, and the torque deviation value is positively correlated with time; determine the current upper limit value of torque for high-altitude according to the torque deviation value and the current upper limit value of initial engine torque; determine an attenuation coefficient according to the current upper limit value of torque for high-altitude and the current upper limit value of the initial engine torque; determine the requested driving force of the vehicle according to the attenuation coefficient, the current vehicle velocity, the current accelerator pedal opening and the driving force mapping information.

In an optional embodiment, the device includes:

the second acquisition module is further configured to acquire actual engine torque and upper limit of the actual engine torque;

the preset conditions include:

an average change rate of the engine revolution speed is less than 700 rpm;

the actual engine torque is greater than 10 Nm;

the upper limit value of the actual engine torque is greater than 0;

a difference between the preset engine revolution speed which is currently selected and the current engine revolution speed is less than 50 rpm;

wherein the current revolution speed level is determined according to a historical revolution speed level.

In an optional embodiment, the device includes:

the determination module is further configured to determine a flatland driving force in the current drive mode according to the current vehicle velocity, the current accelerator pedal opening and the driving force mapping information; determine a highland driving force according to the current vehicle velocity, the current accelerator pedal opening and the driving force mapping information; obtain the requested driving force according to the flatland driving force, the highland driving force and an attenuation coefficient in the current drive mode.

In an optional embodiment, the device includes:

the determination module is further configured to determine the requested driving force according to the current vehicle velocity, the current accelerator pedal opening and the driving force mapping information if the vehicle does not meet the preset conditions.

In an optional embodiment, the device includes:

the second acquisition module is further configured to acquire a driving mode of the vehicle and the drive mode if the gear status is that the vehicle is in the parking gear or the neutral gear, wherein the driving mode includes a forward mode and a reverse mode;

the determination module is further configured to determine a creep driving force according to the driving mode of the vehicle and the current vehicle velocity; determine a compensation coefficient according to the creep driving force; determine an initial requested driving force based on the drive mode, the current vehicle velocity, the current accelerator pedal opening and the driving force mapping information; determine the requested driving force according to the initial requested driving force, the creep driving force and the compensation coefficient.

In an optional embodiment, the device includes:

the determination module is further configured to determine a target requested driving force according to the current vehicle velocity, the current accelerator pedal opening, the drive mode and the driving force mapping information; determine a lower limit value of a force for coasting according to the drive mode and the current vehicle velocity; determine the lower limit value of the force for coasting as the initial requested driving force if the target requested driving force is less than the lower limit value of the force for coasting.

In an optional embodiment, the device includes:

the second acquisition module is further configured to acquire a wheel driving mode of the vehicle if the target requested driving force is greater than the lower limit value of the force for coasting, wherein the wheel driving mode includes electric motor driving and co-driving of electric motor-engine;

the determination module is further configured to determine an upper limit value of the drive force according to the wheel driving mode; determine the upper limit value of the driving force as the initial requested driving force if the target requested driving force is greater than or equal to the upper limit value of the driving force.

In an optional embodiment, the device includes:

the determination module is further configured to determine the target requested driving force as the initial requested driving force if the target requested driving force is less than the upper limit value of the driving force.

Figure 8:
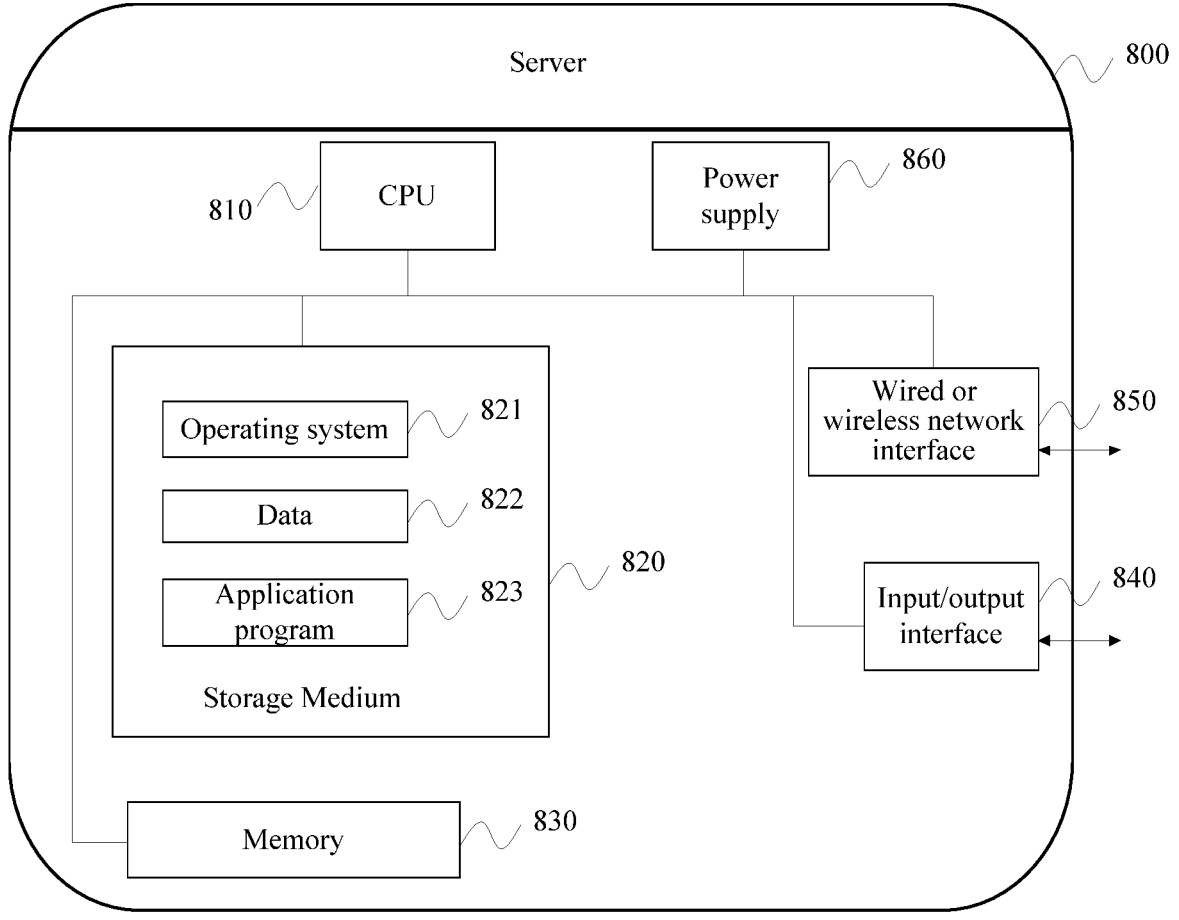
FIG. 8 is a structural block diagram of hardware of a server for determining a requested driving force of a hybrid vehicle according to an embodiment of the present application.

The method embodiment provided in the embodiment of present application can be performed in a computer terminal, a server or similar computing devices. By an example of running in a server, FIG. 8 is a structural block diagram of hardware of a server for a method for determining a requested driving force of a hybrid vehicle according to an embodiment of the present application. As shown in FIG. 8, the server 800 may have great differences due to different configurations or performances, and may include one or more Central Processing Units (CPU) 810 (the processor 810 may include but is not limited to a processing device such as a microcontroller unit MCU or a field-programmable gate array FPGA), a memory 830 for storing data, and one or more storage media 820 for storing application program 823 or data 822 (for example, one or more mass storage apparatus). The memory 830 and the storage media 820 can be temporary storage or permanent storage. The program stored in the storage media 820 may include one or more modules, and each module may include operations to a series of instruction in the server. Furthermore, the CPU 810 can be configured to communicate with the storage media 820 and execute a series of instruction operations in the storage media 820 on the server 800. Server 800 may also include one or more power supplies 860, one or more wired or wireless network interfaces 850, one or more input/output interfaces 840, and/or one or more operating systems 821, such as Windows Server™, Mac OS X™, Unix™, Linux™, FreeBSD™, etc.

The input/output interface 840 can be configured to receive or send data via a network. Specific examples of the network described above may include a wireless network provided by the communication provider of the server 800. In one example, the input/output interface 840 includes a Network Interface Controller (NIC), which can be connected with other network devices through a base station so as to communicate with the Internet. In one example, the input-output interface 840 can be a Radio Frequency (RF) module, which is used for wireless communication with the Internet.

Those skilled in the art may understand that the structure shown in FIG. 8 is only schematic and does not limit the structure of the electronic device described above. For example, the server 800 may also include more or less assemblies than shown in FIG. 8, or have a different configuration from that shown in FIG. 8.

An embodiment of the present application further provides an electronic device, which includes a processor and a memory, wherein at least one instruction, at least one program, a code set or an instruction set is stored in the memory, and the at least one instruction, the at least one program, the code set or the instruction set is loaded and executed by the processor to implement the method for determining a requested driving force described above.

An embodiment of the present application further provides a storage medium, which can be set in a server to store at least one instruction, at least one program, a code set or an instruction set related to a data transmission method in the embodiment of the method, and the at least one instruction, the at least one program, the code set or the instruction set are loaded and executed by the processor to implement the method for determining a requested driving force described above.

Optionally, in the present embodiment, the storage medium can be located in at least one of a plurality of network servers of the computer network. Optionally, in the present embodiment, the above storage media may include, but are not limited to, U disk, Read-Only Memory (ROM), Random Access Memory (RAM), removable hard disk, magnetic disk or optical disk, and variety of other media that can store program codes.

It should be noted that the order of the embodiments described above of the present application is only for description, and does not represent the merits of the embodiments. And those specific embodiments of this specification have been described above. Other embodiments are within the scope of the appended claims. In some situations, the actions or steps recorded in the claims can be performed in a different order than in the embodiments but still achieve the desired results. In addition, the processes depicted in the drawings do not necessarily require the specific order or continuous order shown to achieve the desired results. In some embodiments, multitasking and parallel processing are also possible or may be advantageous.

The embodiments in this specification are described in a progressive manner, and the same or similar parts between each embodiment can be referred to each other. The focused specification of each embodiment is different from the others. Especially, for the embodiments of apparatus, the description of which is relatively simple due to the substantially similarity to the embodiments of the methods, and the relevant parts can be specified with the reference to the partial description of the embodiments of the methods.

Those skilled in the art may understand that all or part of the steps for implementing the embodiments described above can be completed by hardware, or instructing related hardware with program. The program can be stored in a computer-readable storage medium, the storage medium mentioned above can be a read-only memory, a magnetic disk or an optical disk, etc.

The description above is only the preferred embodiments of the present application, which are not intended to limit the present application. Any modification, equivalent replacement, improvement and the like made within the spirit and principle of the present application should be included in the protection scope of the present application.

The invention claimed is:

1. A method for determining a requested driving force of a hybrid vehicle, comprising steps of:

acquiring a gear status, a current vehicle velocity, a current accelerator pedal opening and driving force mapping information of the vehicle, wherein the driving force mapping information represents a corresponding relationship among a vehicle velocity, an accelerator pedal opening and a driving force;

acquiring altitude data and a drive mode of the vehicle if the gear status is that the vehicle is not in a parking gear or a neutral gear; and determining a requested driving force of the vehicle based on the current vehicle velocity, the current accelerator pedal opening, the drive mode and the driving force mapping information if the altitude data is less than a preset altitude; and driving the hybrid vehicle using the determined requested driving force;

wherein after acquiring the gear status, the current vehicle velocity, the current accelerator pedal opening and the driving force mapping information of the vehicle, the method further comprises:

acquiring a driving mode and the drive mode of the vehicle if the gear status is that the vehicle is in the parking gear or the neutral gear, wherein the driving mode comprises a forward mode and a reverse mode;

determining a creep driving force according to the driving mode and the current vehicle velocity of the vehicle;

determining a compensation coefficient according to the creep driving force;

determining an initial requested driving force based on the drive mode, the current vehicle velocity, the current accelerator pedal opening and the driving force mapping information; and determining the requested driving force according to the initial requested driving force, the creep driving force and the compensation coefficient.

2. The method according to claim 1, wherein after acquiring the altitude data and the drive mode of the vehicle if the gear status is that the vehicle is not in the parking gear or the neutral gear, the method further comprises:

if the altitude data is greater than or equal to the preset altitude, and a driving manner of the vehicle is engine driving, acquiring a current engine revolution speed and mapping information of upper limit of initial engine torque of the vehicle, wherein the mapping information of the upper limit of the initial engine torque represents a corresponding relationship among a revolution speed level, a preset engine revolution speed and an upper limit value of the initial engine torque;

determining a current revolution speed level and a preset engine revolution speed which is currently selected according to the current engine revolution speed and the mapping information of the upper limit of the initial engine torque;

if the vehicle meets preset conditions, determining a current upper limit value of the initial engine torque according to the current engine revolution speed and the mapping information of the upper limit of the initial engine torque;

acquiring a corresponding upper limit value of torque for high-altitude at the current engine revolution speed;

determining a torque deviation value according to the current upper limit value of the initial engine torque and the corresponding upper limit value of the torque for high-altitude at the current engine revolution speed, wherein the torque deviation value is positively correlated with time;

determining a current upper limit value of the torque for high-altitude according to the torque deviation value and the current upper limit value of the initial engine torque;

determining an attenuation coefficient according to the current upper limit value of the torque for high-altitude and the current upper limit value of the initial engine torque; and determining the requested driving force of the vehicle according to the attenuation coefficient, the current vehicle velocity, the current accelerator pedal opening and the driving force mapping information.

3. The method according to claim 2, wherein before determining the current upper limit value of the initial engine torque according to the current engine revolution speed and the mapping information of the upper limit of the initial engine torque if the vehicle meets the preset conditions, the method further comprises:

acquiring an actual engine torque and an upper limit value of the actual engine torque;

wherein the preset conditions comprise:

an average change rate of engine revolution speed is less than 700 rpm;

the actual engine torque is greater than 10 Nm;

an upper limit of the actual engine torque is greater than 0;

a difference between the preset engine revolution speed which is currently selected and the current engine revolution speed is less than 50 rpm; and the current revolution speed level is determined according to a historical revolution speed level.

4. The method according to claim 3, wherein determining the requested driving force of the vehicle according to the attenuation coefficient, the current vehicle velocity, the current accelerator pedal opening and the driving force mapping information comprises:

determining a flatland driving force in a current drive mode according to the current vehicle velocity, the current accelerator pedal opening and the driving force mapping information;

determining a highland driving force according to the current vehicle velocity, the current accelerator pedal opening and the driving force mapping information; and acquiring the requested driving force according to the flatland driving force, the highland driving force and the attenuation coefficient in the current drive mode.

5. The method according to claim 2, wherein after determining the current revolution speed level and the preset engine revolution speed which is currently selected according to the current engine revolution speed and the mapping information of the upper limit of the initial engine torque, the method further comprises:

if the vehicle does not meet the preset conditions, determining the requested driving force according to the current vehicle velocity, the current accelerator pedal opening and the driving force mapping information.

6. The method according to claim 1, wherein determining the initial requested driving force based on the driving mode, the drive mode, the current vehicle velocity, the current accelerator pedal opening and the driving force mapping information comprises:

determining a target requested driving force according to the current vehicle velocity, the current accelerator pedal opening, the drive mode and the driving force mapping information;

determining a lower limit value of a force for coasting according to the drive mode and the current vehicle velocity; and determining the lower limit value of the force for coasting as the initial requested driving force if the target requested driving force is less than the lower limit value of the force for coasting.

7. The method according to claim 6, wherein after determining the lower limit value of the force for coasting according to the driving mode and the current vehicle velocity, the method further comprises:

if the target requested driving force is greater than the lower limit value of the force for coasting, acquiring a wheel driving mode of the vehicle, wherein the wheel driving mode comprises electric motor driving and co-driving of electric motor-engine;

determining an upper limit value of the driving force according to the wheel driving mode; and if the target requested driving force is greater than or equal to the upper limit value of the driving force, determining the upper limit value of the driving force as the initial requested driving force.

8. The method according to claim 7, wherein after determining the upper limit value of the driving force according to the wheel driving mode of the vehicle, the method further comprises:

if the target requested driving force is less than the upper limit value of the driving force, determining the target requested driving force as the initial requested driving force.

9. An apparatus, comprising a processor and a memory, wherein at least one instruction, at least one program, a code set or an instruction set is stored in the memory, and the at least one instruction, the at least one program, the code set or the instruction set is loaded and executed by the processor to implement the method for determining a requested driving force according to claim 1.

10. A computer storage medium, wherein at least one instruction or at least one program is stored in the computer storage medium, and the at least one instruction or at least one program is loaded and executed by a processor to implement the method for determining a requested driving force according to claim 1.

11. The method according to claim 1, wherein determining the requested driving force of the vehicle based on the current vehicle velocity, the current accelerator pedal opening, the drive mode and the driving force mapping information comprises:

determining target driving force mapping information according to the drive mode and the driving force mapping information; and if the target driving force mapping information is corresponding driving force mapping information in a first drive mode, determining the requested driving force of the vehicle based on the current vehicle velocity, the current accelerator pedal opening and the target driving force mapping information.

12. The method according to claim 11, wherein after determining the target driving force mapping information according to the drive mode and the driving force mapping information, the method further comprises:

if the target driving force mapping information is corresponding driving force mapping information in a second drive mode, acquiring first accelerator pedal correction mapping information; wherein the first accelerator pedal correction mapping information represents a corresponding relationship among a vehicle velocity, an accelerator pedal opening and a corrected accelerator pedal opening in the second drive mode, and fuel consumption in the second drive mode is less than fuel consumption in the first drive mode;

determining a first corrected accelerator pedal opening according to the current vehicle velocity, the current accelerator pedal opening and the first accelerator pedal correction mapping information; and determining the requested driving force of the vehicle based on the current vehicle velocity, the first corrected accelerator pedal opening and the target driving force mapping information.

13. The method according to claim 12, wherein after determining the target driving force mapping information according to the drive mode and the driving force mapping information, the method further comprises:

if the target driving force mapping information is corresponding driving force mapping information in a third drive mode, acquiring second accelerator pedal correction mapping information; wherein the second accelerator pedal correction mapping information represents a corresponding relationship among a vehicle velocity, an accelerator pedal opening and a corrected accelerator pedal opening in the third drive mode, and fuel consumption in the third drive mode is greater than the fuel consumption in the first drive mode;

determining a second corrected accelerator pedal opening according to the current vehicle velocity, the current accelerator pedal opening and the second accelerator pedal correction mapping information; and determining the requested driving force of the vehicle based on the current vehicle velocity, the second corrected accelerator pedal opening and the target driving force mapping information.

14. The method according to claim 13, wherein after acquiring the altitude data and the drive mode of the vehicle if the gear status is that the vehicle is not in the parking gear or the neutral gear, the method further comprises:

if the altitude data is less than a preset altitude and the vehicle is in a switching state between any two modes among the first drive mode, the second drive mode and the third drive mode, determining a requested driving force before switching according to a vehicle velocity in a drive mode before switching, an accelerator pedal opening in the drive mode before switching and the driving force mapping information;

determining a requested driving force after switching according to a vehicle velocity in a drive mode after switching, an accelerator pedal opening in the drive mode after switching, the drive mode after switching and the driving force mapping information; and determining a requested driving force of the vehicle based on the requested driving force before switching, the requested driving force after switching and a preset interpolation coefficient.

15. The method according to claim 14, wherein the preset interpolation coefficient ranges from 0 to 1, and the interpolation coefficient is positively correlated with time.

16. A control device for a requested driving force, comprising:

a first acquisition module, configured to acquire a gear status, a current vehicle velocity, a current accelerator pedal opening and driving force mapping information of a vehicle, wherein the driving force mapping information represents a corresponding relationship among a vehicle velocity, an accelerator pedal opening and a driving force;

a second acquisition module, configured to acquire altitude data and a drive mode of the vehicle if the gear status is that the vehicle is not in a parking gear or a neutral gear; and a determination module, configured to determine a requested driving force of the vehicle based on the current vehicle velocity, the current accelerator pedal opening, the drive mode and the driving force mapping information if the altitude data is less than a preset altitude;

wherein the vehicle is driven by using the determined requested driving force, and after acquiring the gear status, the current vehicle velocity, the current accelerator pedal opening and the driving force mapping information of the vehicle, the device is further configured to:

acquire a driving mode and the drive mode of the vehicle if the gear status is that the vehicle is in the parking gear or the neutral gear, wherein the driving mode comprises a forward mode and a reverse mode;

determine a creep driving force according to the driving mode and the current vehicle velocity of the vehicle;

determine a compensation coefficient according to the creep driving force;

determine an initial requested driving force based on the drive mode, the current vehicle velocity, the current accelerator pedal opening and the driving force mapping information; and determine the requested driving force according to the initial requested driving force, the creep driving force and the compensation coefficient.

\* \* \* \* \*